(12) United States Patent
Lagerweij et al.

(10) Patent No.: US 10,843,907 B2
(45) Date of Patent: Nov. 24, 2020

(54) HOISTING SYSTEM FOR INSTALLING A WIND TURBINE

(71) Applicant: LAGERWEY WIND B.V., Barneveld (NL)

(72) Inventors: Hendrik Lambertus Lagerweij, Kootwijkerbroek (NL); Andre Heinz Pubanz, Amersfoort (NL); Aart Van De Pol, Otterlo (NL); Albért Waaijenberg, Barneveld (NL); Gustave Paul Corten, Koedijk (NL)

(73) Assignee: LAGERWEY WIND B.V., Barneveld (NL)

( * ) Notice: Subject to any disclaimer, the term of this patent is extended or adjusted under 35 U.S.C. 154(b) by 220 days.

(21) Appl. No.: 15/765,194

(22) PCT Filed: Sep. 30, 2016

(86) PCT No.: PCT/EP2016/073497
§ 371 (c)(1),
(2) Date: Mar. 30, 2018

(87) PCT Pub. No.: WO2017/055598
PCT Pub. Date: Apr. 6, 2017

(65) Prior Publication Data
US 2018/0282134 A1 Oct. 4, 2018

(30) Foreign Application Priority Data

Oct. 1, 2015 (NL) ..................................... 1041499
Jun. 9, 2016 (NL) ..................................... 2016927

(51) Int. Cl.
*F03D 11/04* (2006.01)
*B66C 23/20* (2006.01)
(Continued)

(52) U.S. Cl.
CPC .......... *B66C 23/207* (2013.01); *B66C 23/185* (2013.01); *B66C 23/32* (2013.01);
(Continued)

(58) Field of Classification Search
CPC .. F03D 13/10; F03D 13/20; F03D 2017/0091; B66C 23/207; B66C 23/54;
(Continued)

(56) References Cited

U.S. PATENT DOCUMENTS 756,216 A 4/1904 Crunican
2,720,694 A 10/1955 Hines
(Continued)

FOREIGN PATENT DOCUMENTS

CA 2892651 A1 6/2014
CN 101375011 A 2/2009
(Continued)

*Primary Examiner* — Eldon T Brockman
(74) *Attorney, Agent, or Firm* — Seed Intellectual Property Law Group LLP

(57) ABSTRACT

A hoisting system for the installation of a wind turbine wherein said hoisting system comprises measures to achieve a load bearing connection to the tower of the wind turbine and comprises measures to move the hoisting system up and down along the tower wherein the hoisting system, when it is fixed to an already installed part of the wind turbine tower with said load bearing connection, is arranged to install or remove any of a tower segment, a nacelle, a generator, a hub, and a blade in one or more combined hoists or in a single hoist.

37 Claims, 16 Drawing Sheets

(51) Int. Cl.
  *B66C 23/18* (2006.01)
  *B66C 23/32* (2006.01)
  *F03D 13/10* (2016.01)
  *E02B 17/02* (2006.01)
  *F03D 13/20* (2016.01)
  *B66C 23/00* (2006.01)
  *B66C 23/82* (2006.01)
  *E04H 12/34* (2006.01)
  *E02B 17/00* (2006.01)

(52) U.S. Cl.
  CPC .............. *B66C 23/54* (2013.01); *B66C 23/82* (2013.01); *E02B 17/027* (2013.01); *E04H 12/342* (2013.01); *F03D 13/10* (2016.05); *F03D 13/20* (2016.05); *B66C 2700/0328* (2013.01); *E02B 2017/0039* (2013.01); *E02B 2017/0043* (2013.01); *E02B 2017/0047* (2013.01); *E02B 2017/0091* (2013.01); *F05B 2230/61* (2013.01); *F05B 2230/70* (2013.01); *F05B 2230/80* (2013.01); *F05B 2240/912* (2013.01); *F05B 2240/916* (2013.01); *F05B 2240/95* (2013.01); *Y02E 10/721* (2013.01); *Y02E 10/726* (2013.01); *Y02E 10/727* (2013.01); *Y02E 10/728* (2013.01); *Y02P 70/523* (2015.11)

(58) Field of Classification Search
  CPC .................. B66C 23/185; B66C 23/32; B66C 2700/0328; E04H 12/342; E02B 17/027; E02B 2017/0091
  See application file for complete search history.

(56) References Cited

U.S. PATENT DOCUMENTS

| | | |
|---|---|---|
| 4,266,911 A | 5/1981 | Helm et al. |
| 4,311,434 A | 1/1982 | Abe |
| 6,357,549 B1 | 3/2002 | Brennan et al. |
| 6,408,575 B1 | 6/2002 | Yoshida et al. |
| 6,522,025 B2 | 2/2003 | Willis et al. |
| 6,614,125 B2 | 9/2003 | Willis et al. |
| 8,069,634 B2 | 12/2011 | Livingston et al. |
| 8,590,276 B2 | 11/2013 | Kryger et al. |
| 8,939,299 B2 | 1/2015 | Ahler et al. |
| 9,022,691 B2 | 5/2015 | Westergaard |
| 9,238,923 B2 | 1/2016 | Arlaban Gabeiras et al. |
| 2008/0240864 A1* | 10/2008 | Belinsky ............... E02D 27/42 405/223.1 |
| 2009/0019816 A1 | 1/2009 | Lockwood et al. |
| 2010/0313497 A1 | 12/2010 | Jensen |
| 2011/0206510 A1* | 8/2011 | Langen ................ F03D 1/0658 416/61 |
| 2015/0048043 A1 | 2/2015 | Laurens et al. |
| 2015/0300037 A1* | 10/2015 | Pellerin ............... B66C 23/207 52/173.1 |
| 2017/0190391 A1 | 7/2017 | Siegfriedsen |

FOREIGN PATENT DOCUMENTS

| | | |
|---|---|---|
| CN | 103145051 B | 2/2015 |
| DE | 2735298 A1 | 2/1979 |
| DE | 2823525 B1 | 8/1979 |
| DE | 9414643.8 U1 | 11/1994 |
| DE | 19647515 A1 | 5/1998 |
| DE | 19741988 A1 | 4/1999 |
| EP | 2746571 A2 | 6/2014 |
| JP | S5162222 U | 5/1976 |
| JP | S56155193 A | 12/1981 |
| JP | S59158794 A | 9/1984 |
| JP | S63189391 A | 8/1988 |
| JP | 2003184730 A | 7/2003 |
| WO | 2009097858 A1 | 8/2009 |
| WO | 2014082176 A1 | 6/2014 |
| WO | 2016000681 A1 | 1/2016 |
| WO | 2016112929 A1 | 7/2016 |

* cited by examiner

HOISTING SYSTEM FOR INSTALLING A WIND TURBINE

BACKGROUND

Technical Field

The present invention relates to a hoisting system for the installation of a wind turbine, a wind turbine comprising measures to facilitate the use of said hoisting system, a segment of a wind turbine, a method for installing a wind turbine, a method for fixing a hoisting system to a wind turbine, a method for removing a hoisting system from a wind turbine and to a method for adapting an existing wind turbine.

Background

The installation of wind turbines offshore is an extremely expensive operation. A large part of the high installation costs are related to the hoisting of the wind turbine parts to be installed on top of the foundation. Those parts are heavy and have precisely shaped joints which should be installed accurately and carefully to each other. This requires cranes which are installed on so-called jack-ups: self elevating platforms with moveable legs capable of raising the hull over the surface of the sea. There are some known alternatives for jack-ups such as that disclosed in U.S. Pat. No. 9,022,691B2. Herein a vessel is secured to the turbine foundation and the vessel subsequently lowers a complete wind turbine which is secured to the vessel at the bottom of the tower on the foundation. This system still requires a large vessel. Furthermore the forces applied by the vessel to the foundation are huge during high or even moderate sea states. This means that the costs are still high, that the operational windows is much limited and that still there is no solution for, e.g., replacement of a blade. Another installation method is disclosed in WO2016112929 wherein a vessel is lowered until it rests on the seabed so that it provides a stable working platform. This option has about the same disadvantages as a conventional jack-up. The floating offshore wind turbine as disclosed in WO2016000681A1 reduces the installation costs however it still does not offer a cost effective solution in case of a failure of larger part such as, e.g., a blade, a bearing or a generator.

BRIEF SUMMARY

Costs of labor and maintenance increase only gradually with increasing turbine size, and therefore to minimize costs, wind turbines are getting bigger and bigger. With increasing size and height the installation costs of the turbines are not rising gradually but at least linearly with turbine size. The largest industrial cranes available are required to install the largest land based wind turbines. Those heavy modular crane units are expensive, often require strengthening of the roads and special transportation permits. In addition to these disadvantages said cranes need a lot of space which is not always available and when such a crane is needed for the next turbine in a wind farm it may occur that the crane cannot move thereto for example because the terrain is complex or the roads are too small. Then the crane has to be decommissioned, transported in parts and commissioned again which is an inefficient time consuming operation.

Therefore there is a need to be able to install both offshore and onshore wind turbine more efficiently and in particular without the need of a large general purpose crane.

Hereto, according to an aspect of the invention a hoisting system is proposed for the installation of an offshore wind turbine wherein said hoisting system comprises measures to achieve a load bearing connection to the tower of the wind turbine and comprises measures to move the hoisting system up and down along the tower wherein the hoisting system, when it is fixed to an already installed part of the wind turbine tower with said load bearing connection, is arranged to install or remove any of the tower segments above the load bearing connection, the nacelle, the generator, the hub, and the blades.

Preferably, during hoisting operations the load bearing connection transfers a substantial portion of the weight of the hoisting system to the installed part of the wind turbine tower, for example at least 40% of the weight or more preferably at least 80% of the weight.

The hoisting system according to the above aspect of the invention has the amazing benefit that is does not require any other stabilization means than the already present part of the wind turbine. Thereby it cancels a large part of the costs and complexity of the offshore installation process. Furthermore, due to the climbing property, the hoisting system is much smaller and lighter than a conventional offshore crane. Additionally the hoisting system is also capable of replacing for example a single blade or only the generator without the need of a jack-up. These advantages are really big and offer a surprising solution for the persistent problem of the high installation and maintenance costs offshore.

According to an aspect of the invention a hoisting system is proposed for the installation or maintenance of an offshore or onshore wind turbine comprising a column, a boom and a winch wherein said column comprises measures to achieve a load bearing connection to the tower of the wind turbine and wherein said column comprises measures to move the hoisting system up and down along the tower. The tower comprises one or more fixation points and the column is arranged for creating the load bearing connection to a part of the tower using the one or more fixation points, and wherein the column is arranged to move the hoisting system essentially in vertical direction along said part of the tower when connected to the part of the tower.

Such a system can install successive tower segments while moving upwardly along the installed tower segments. After the tower is completed it can install the nacelle, generator, hub and the rotor blades. Advantageously, such a system can be used for both offshore and onshore wind turbines.

Advantageously, the hoisting system of the present invention can be used instead of conventional large industrial cranes for installing wind turbines, enabling wind turbines to be built at lower costs and without requiring strengthening of roads and special transportation permits. Furthermore, the area of the building site of a wind turbine can be reduced from up to 3000 $m^2$ when using conventional cranes to about 200 $m^2$ when using the hoisting system of the present invention.

The column of the hoisting system typically comprises a rail which guides the hoisting system in essentially vertical direction along fixation points which are fixed to the tower. A beneficial maximum length of said rail is 60 m, while a beneficial minimum length is 10 m, preferably 20 m, more preferably 34 m. The relatively long rail allows the hoisting of heavy parts such as the lower tower segments or the nacelle without applying high sideward forces to the tower since force equals bending moment divided by arm.

The hoisting system is efficient since it allows simple and fast movement of the system up and down along the fixation points on the tower.

In an embodiment the hoisting system comprises a rail of which a section can be put in a first position wherein the rail section can be placed over a fixation point on the wind turbine tower and in a second position wherein it encloses the fixation point in such a way that the rail can only move up and down along the tower.

In an embodiment the column of the hoisting system comprises measures to move the hoisting system up and down along the tower. Such measures can comprise a climbing actuator and or a connection actuator which both can be of the type of a hydraulic cylinder or an electromechanical linear actuator. Those actuators can have a fixed part and a moving part. The fixed part of each actuator can be fixed at one end to the column possible in a hinged manner. In one embodiment according to the invention the other end of the fixed part of the climbing actuator is connected to the end of the moving part of the connection actuator so that the connection actuator can move the climbing actuator in a direction from nearby the column to further away from the column. The end of the moving part of the climbing actuator is the connection end, which comprises measures for connecting to a fixation point. A climbing system includes a climbing actuator which can move the hoisting system up and down and the connection end of the climbing actuators can be controlled by the connection actuator from a free position to a position wherein the connection end is connected to a fixation point.

In an embodiment a climbing system comprises a double set of climbing and connection actuators, which has the advantages of distributing the loads an therefore reducing the costs of the system and introducing redundancy so that the climbing system still can be operated when combination of climbing and connection actuator is failing. In case of such a failure the hoisting system at least still can be moved downward to the ground thanks to the redundancy.

In an embodiment the climbing system can comprise a spindle connected to the rail and ranging over at least the maximum distance between successive fixation points, which spindle is driven by an electric or hydraulic motor and is connected to a wagon which moves by rotating the spindle along the rail and which wagon can create a load bearing connection with a fixation point.

In an embodiment the hoisting system comprises a first and a second climbing system, wherein the distance between the center of the connection of the first climbing actuator to the column and the center of the connection of the second climbing system to the column is in particular about 5.7 m and at least 1.8 m in length direction of the column. The advantage of having two climbing systems is that each climbing actuators can have about half the length compared to a single climbing system which provides better stability and lower costs. The two climbing systems are repeatedly used to move the hoisting system in essentially vertical direction along the tower. For example first the first climbing system is fixed to a fixation point and pulls the hoisting upward over about 50% of the distance between fixation points, then the second climbing system connects to another fixation point, then the first climbing system disconnects and subsequently the second climbing system pulls the hoisting system further upwardly so that it can be fixed to the next fixation point. It will be clear that also three, four, five, etc., climbing systems can be used which each can move the hoisting over respectively about one third, one fourth, one fifth, etc., of the distance between fixation points, which distance is usually between 6 m and 26 m, preferably between 10 m and 18 m, for example about 11.5 m.

In an embodiment the hoisting system comprises a chain moving around over driven cogwheels which are fixed to the column. By fixing the chain to a fixation point it can move the hoisting system up and down. Another option to move the hoisting system is to fix a cable at one side to a fixation point and at another side to a winch which is mounted to the column.

In an embodiment the hoisting system comprises a coupling which can fix the hoisting system rigidly to a fixation point in such a manner that it can transfer vertical forces of the hoisting system to the fixation point in particular at least 30% of those vertical forces and more in particular at least 90% of those vertical forces. In an embodiment the height position of a coupling in the column is within the lower 65% of the length of the rail and preferably between 35% and 65% of the rail length.

In an embodiment the coupling between the column and the fixation point is such that during hoisting operation it allows for at least 0.25 degrees and preferably at least 0.5 degrees and more preferably at least 1 degrees for example 2 degrees rotational freedom about an imaginary horizontal axis between the parts joint by the coupling. This freedom avoids that large bending moments are exerted on the fixation points and therefore reduces costs.

A beneficial embodiment of the hoisting system comprises a boom which reaches at least 15 m from the rail and preferably at least 25 m from the rail. According to one embodiment of the hoisting system the maximum length of the boom is 60 m. A further beneficial hoisting system is that wherein the boom is fixed to the column via a yaw bearing and in particular wherein the rotation axis of said yaw bearing is inclined to the length direction of the rail by more than 0.5 degrees, preferably by more than 1 degree, more preferably by less than 5 degrees. In a further beneficial embodiment of the hoisting system the boom is fixed with a tilt hinge to the yaw bearing or the boom comprises a tilt hinge, wherein the tilt hinge can be adjusted over at least 20 degrees and preferably over less than 200 degrees. The tilt motion can be driven by a hydraulic or electro mechanic actuator.

In an embodiment the column is extended to more than 15 m and preferably more than 25 m above the rail and comprises a yaw bearing whereon an about horizontal boom is attached which comprises a hoisting point which can move along the boom.

In an embodiment the boom comprises a winch which drives the hoisting cable and in particular the boom comprises multiple winches which each have a separate hoisting cable leading to the hoisting point so that each winch carries part of the total load.

In an embodiment the hoisting system comprises a boom which is bended or inflected so that a line piece from the center of the tilt hinge to the hoisting point reaches a distance to the boom of at least 1.5 m and preferably of at least 2.5 m and more preferably of about 4 m.

The hoisting system can be powered with an electric cable from the ground, from the turbine foundation or from a vessel. In an embodiment the hoisting system comprises a power supply based on a chemical reaction such as a diesel generator, a fuel cell or a battery, wherein said power supply is installed in the hoisting system so that a long cable to the ground or to sea level is avoided. This saves the costs and weight of the cable and avoids the problem of motion of the cables by the wind which reduces the weather window for hoisting operations and reduces the reliability of the system.

In an embodiment the power supply is connected directly or indirectly via an electric motor to the hydraulic pump. In another embodiment the hoisting system comprises a second hydraulic pump, which, e.g., can be driven by an electric cable from the ground as backup.

While, for the onshore installation of a wind turbine, a conventional heavy crane requires several dozens of trucks, e.g., 50 trucks, for transportation, the hoisting system can be transported by less than 5, e.g., just 2 standard trucks, which gives advantage in cost and space requirements at the site.

A further advantage for onshore wind turbine is that the hoisting system can be installed in several hours while the erection of a heavy crane takes several days.

An even further advantage for onshore wind turbines is that the hoisting system can move up and down along the wind turbine tower relatively fast compared to known lifting systems.

According to a further aspect of the invention a wind turbine is proposed comprising a tower, a nacelle, a generator, a hub and at least a blade wherein the tower comprises fixation points for the fixation and guiding of a hoisting system and in particular of the hoisting system according to the invention.

In an embodiment the wind turbine comprises fixation points at a relative spacing of more than 10 m and less than 30 m.

In an embodiment the tower of the wind turbine comprises tubular overlapping segments which are bolted together on the overlap and wherein a fixation point is installed on the overlap so that less stiffening of the tower near the fixation points is required since the double layered overlapping parts have more stiffness by themselves.

In an embodiment a fixation point comprises a stiffening structure which is fixed to the tower and which extends from the center of the fixation point by at least 50 cm and preferably by at least 100 cm. Such a stiffening structure can be installed at the outer side or at the inner side or at both sides of the tower. In particular for the first or second tower segment of a segmented tower the stiffening structure may comprise a structural beam from the fixation point to the tower foundation or a structural beam in about horizontal direction to the tower wall at a position which is more than 10 degrees and preferably more than 30 degrees away from the fixation point when rotating around the tower axis along the tower wall.

In an embodiment the wind turbine the fixation points are aligned in the longitudinal direction of the tower with a maximum deviation. If there are N fixation points which are numbered 1 to N in upward direction for fixation point M for M=1 to N−2, then the line between the centers of fixation points M and M+1 reaches a distance to the center of a successive fixation point of maximally 5 cm, in preferably of maximally 10 cm and more preferably of maximally 20 cm.

In an embodiment the wind turbine comprises a tower with a load carrying wall and in particular one wherein the wall is load carrying over a tower length a wind turbine comprises a non-structural tower with a load carrying wall over its full length.

In an embodiment the wind turbine comprises a tower of which a horizontal cross section of the outer side is shaped circular or polygonal.

In an embodiment the wind turbine comprises a tubular tower which comprises vertical segments, which segments are made of bended or folded steel plates which extend over the vertical length of said segment.

In an embodiment the wind turbine comprises a tower which comprises multiple vertical segments of a length between 10 m and 22 m and preferably between 10 m and 16 m.

The tower can be of the tubular type and can be made of pre tensioned concrete or of wood or of steel. Alternatively, the tower can be a structural tower, or in other words a lattice tower made of steel or wood. The tower can be partly of the tubular and partly of the lattice type. The lower part of the tower can be a tripod with three tubular legs, a jacket or a floating structure, in particular in offshore sites.

In an embodiment the wind turbine comprises a tower which is tapered over at least 50% of the tower length and preferably over at least 80% of the tower length.

In an embodiment the hoisting system comprises a straight rail which can be guided over at least two fixation points during climbing and therefore the fixation points are typically aligned following a straight line in the longitudinal direction of the tower of the wind turbine. Due to spatial and dimensional tolerances in the fixation points in the rail, some curvature is allowed between the fixation points.

The rail of the hoisting system may not be straight has and can have a constant curvature instead. In such a case the hoisting system can climb towers with a constant curvature in the tower wall in vertical direction.

The rail of hoisting system can be connected to just one single fixation point in a part of the track. Then the hoisting system is typically also connected via the climbing system to a second fixation point. The advantage of such a hoisting system is that it can move along towers which change of taper level, e.g., from cylindrical to tapered.

In an embodiment the wind turbine comprises a tower of which the fixation points including the stiffening thereof cover together less than 10% and preferably less than 20% of the tower length in any side view of the tower.

In an embodiment the tower center is installed at a horizontal distance to the center of a dike of less than 100 m, preferably less than 50 m and more preferably less than 20 m.

In an embodiment two hoisting systems are applied to the same wind turbine. The two hoisting systems can be installed below each other on the same track of fixation points or can be installed at different angles in a cylindrical coordinate system around the tower axis. The tower could comprise two tracks of fixation points at different angles from the bottom to the top or a single track at a first angle and just one or more fixation points at a second angle. In the latter case a first hoisting system can climb all the way up to the tower top along the single track of fixation points at said first angle and can install the second hoisting system to the one or more fixation points at that second angle. The difference between said angles in said cylindrical coordinate system comprises at least 20 degrees, preferably at least 45 degrees and more preferably at least 60 degrees, for example 90 degrees. The second hoisting system may differ from the first hoisting system, e.g., it may not have a column being arranged for climbing, or may have another boom length, etc.

Using two hoisting systems has several advantages. First the hoisting systems together can hoist heavier parts and therefore are suitable for the installation of larger wind turbines. Second the hoisting of parts by two cranes is less sensitive to the wind thus more stable so that the operational weather interval increases. Third the loads exerted by two hoisting systems to the tower are more distributed compared to the situation of a single heavier hoisting system. The distribution of loads reduces the costs of the hoisting systems and of the fixation points. Fourth the hoisting systems can be used more efficiently because the same system is used for installing mid size and large size wind turbines and when a wind farm is installed, each single hoisting system can be used to erect wind turbine towers while only for the hoisting of the nacelle, generator, hub and rotor the hoisting systems are applied together.

In an embodiment of the wind turbine comprises an offshore turbine, of which the part that passes the sea level can comprise a fixation point, e.g., wherein the transition piece comprises the fixation point for a hoisting system.

The term offshore turbine also refers to turbines installed in lakes or rivers.

In an embodiment an offshore turbine comprises a fixation point below the water line.

In an embodiment the hoisting system is pre-installed on a tower segment and said hoisting system and tower segment are in a single hoist installed on a lower already installed tower part.

In an embodiment the hoisting system is installed to the already built part of an offshore turbine by using an Ampelmann or by using a small jack-up. Even in the latter case the benefit is large since the hoisting system is installed at a much lower height than the turbine height.

In an embodiment the hoisting system self-installs itself by pulling itself upwardly to the already installed part of the offshore turbine thereby moving itself from an about horizontal position from a vessel to an about vertical position nearby the already installed wind turbine tower until it can create a load bearing connection to the tower.

In the embodiments concerning an offshore turbine the hoisting system can be used to complete the installation of the entire offshore wind turbine by lifting parts from a vessel and installing them. Said vessel does not need to be an expensive jack-up vessel and therefore reduces the installation costs much. Optionally the hoisting system remains on the turbine after commissioning to serve as maintenance tool or for the decommissioning of the turbine later.

In an embodiment the wind turbine has a axis height of more than 80 m, preferably more than 130 m and more preferably more than 180 m, wherein the maximum axis height according to an embodiment is 500 m.

In an embodiment the wind turbine has a design rpm, of which the ratio between the design rotor speed at 12 m/s wind speed and at 6 m/s wind speed is above 1.3, preferably above 1.5 and more preferably above 1.8, and less than 3. Such turbines with variable rotor speed have a range of excitation frequencies wherein the tower should not reveal resonance. In such cases, advantageously the attachment of fixation points hardly influences tower eigen frequencies and does not cause the tower to have different eigen frequencies for excitations in the plane of the tower axis and the fixation points compared to those in the plane perpendicular thereto and parallel to the tower axis.

According to an aspect of the invention a combination of a wind turbine with a hoisting system is proposed.

In an embodiment the rail of the hoisting system during hoisting work is fixed permanently in a rigid non-slidable manner to the column of the hoisting system while said rail is rigidly or slidably fixed to the fixation points on the tower of the wind turbine.

In an embodiment the rail of the hoisting system is at least connected to two or three fixation point during hoisting work.

In an embodiment the highest fixation point where the hoisting system is fixed to the tower during the hoisting of tower parts corresponds to the overlapping part of the highest two installed tower segments.

According to an aspect of the invention a method is proposed for installing an onshore wind turbine, the method comprising building at least a part of a tower of the wind turbine by placing one or more tower segments using the hoisting system.

In an embodiment the lower one to three tower segments can be installed with a conventional method.

In an embodiment, subsequently the installation of the rail of the hoisting system to the fixation points of the one or more installed tower segments can be performed.

In an embodiment wherein the hoisting system is attached to the first two installed tower segments, the hoisting system hoists and installs the third segment without a fixation point installed and then installs the fixation point to the third segment. An advantage of this method is that when the third segment is lowered, the additional constraint is avoided and its fixation point should simultaneously fit into the rail of the hoisting system.

In an embodiment the hoisting of one to three higher tower segments in parts or in single hoists and the installation of said higher segments can be performed.

The repetition of unlocking, moving and relocking the hoisting system in a higher position and the hoisting and installation of one or two higher tower segments results in the tower being fully assembled.

In an embodiment the hoisting system can be unlocked, moved and relocked in the highest available position and the hoisting of the nacelle, generator, hub and the rotor blades can be performed in one or more combined hoists or in a single hoist.

In case of single blade hoisting the hoisting system can be used to turn the hub in a convenient position for installation a next blade by hoisting an installed blade to a lower or higher position.

According to an aspect of the invention the hoisting system an be unlocked and moved downwardly by repetitively locking and moving the hoisting system back to the tower bottom. At the bottom the hoisting system can be removed from the tower.

In the case of an onshore wind turbine wherein the hoisting system installs also (part of) the first tower segment, a temporal separate support can be required or the section of the first segment with a fixation point can be installed first by a conventional crane after which the hoisting system can be installed.

In an embodiment the horizontal distance between the hoisting point of the boom and the highest applied fixation point is less than the diameter of a hoisted tower segment.

In an embodiment of the hoisting system it does not comprise a climbing system. Such a hoisting system is suitable for maintenance work on an already installed turbine: it can be pulled upwardly by a cable fixed substantially near the upper end of the wind turbine tower and it can glide with the rail over the fixation points.

BRIEF DESCRIPTION OF THE SEVERAL VIEWS OF THE DRAWINGS

The following drawings show exemplary embodiments of the invention.

The drawings are to be understood not to be drawn to scale.

DETAILED DESCRIPTION

Figure 1A:
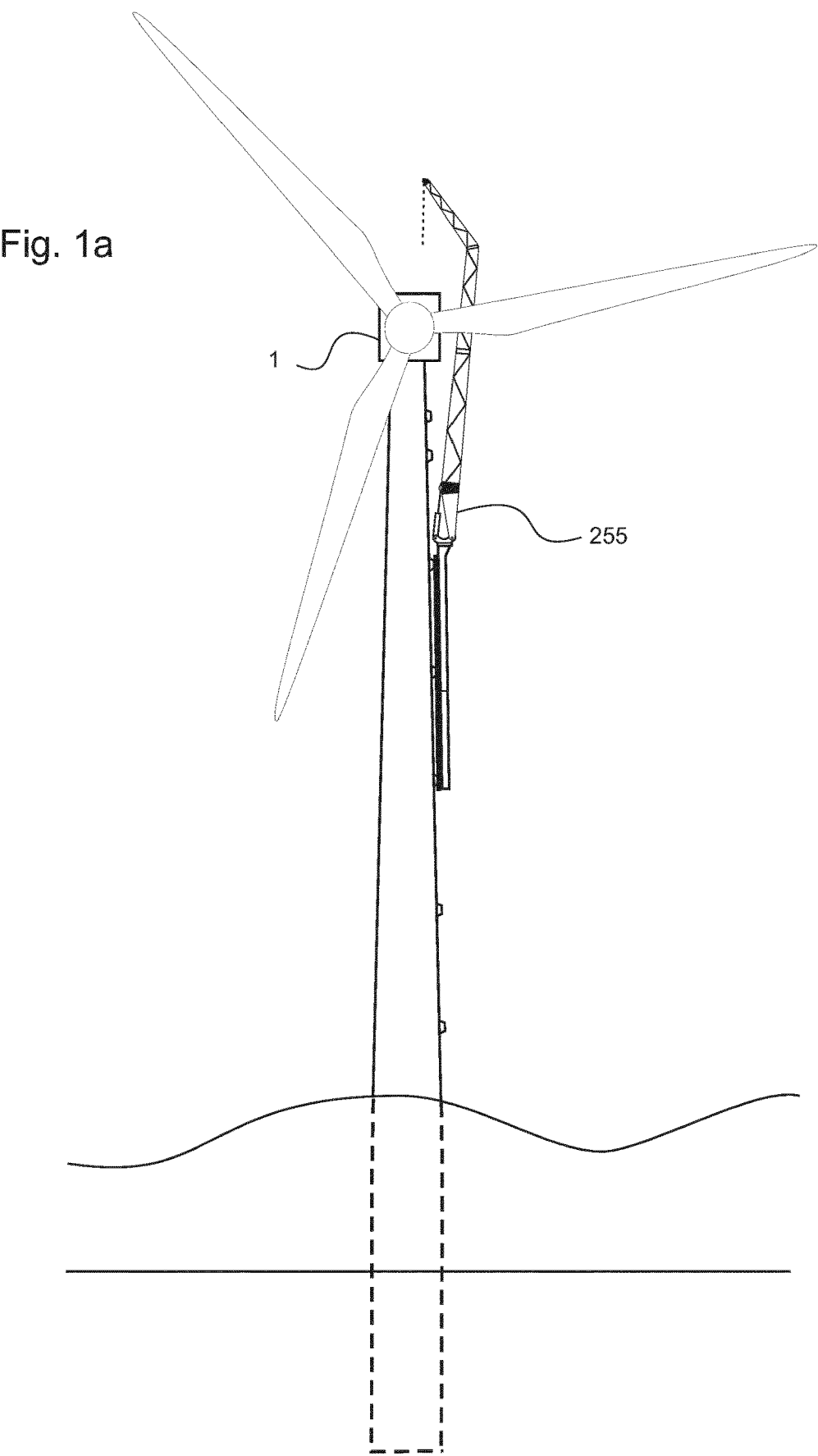
FIG. 1a: an offshore wind turbine and a hoisting system.

FIG. 1*a* shows an embodiment of an offshore wind turbine 1 with a hoisting system 255. The figure does not show an access platform installed to the turbine. In an embodiment such a platform may be arranged to temporarily store a rotor blade or another large service part.

Figure 1B:
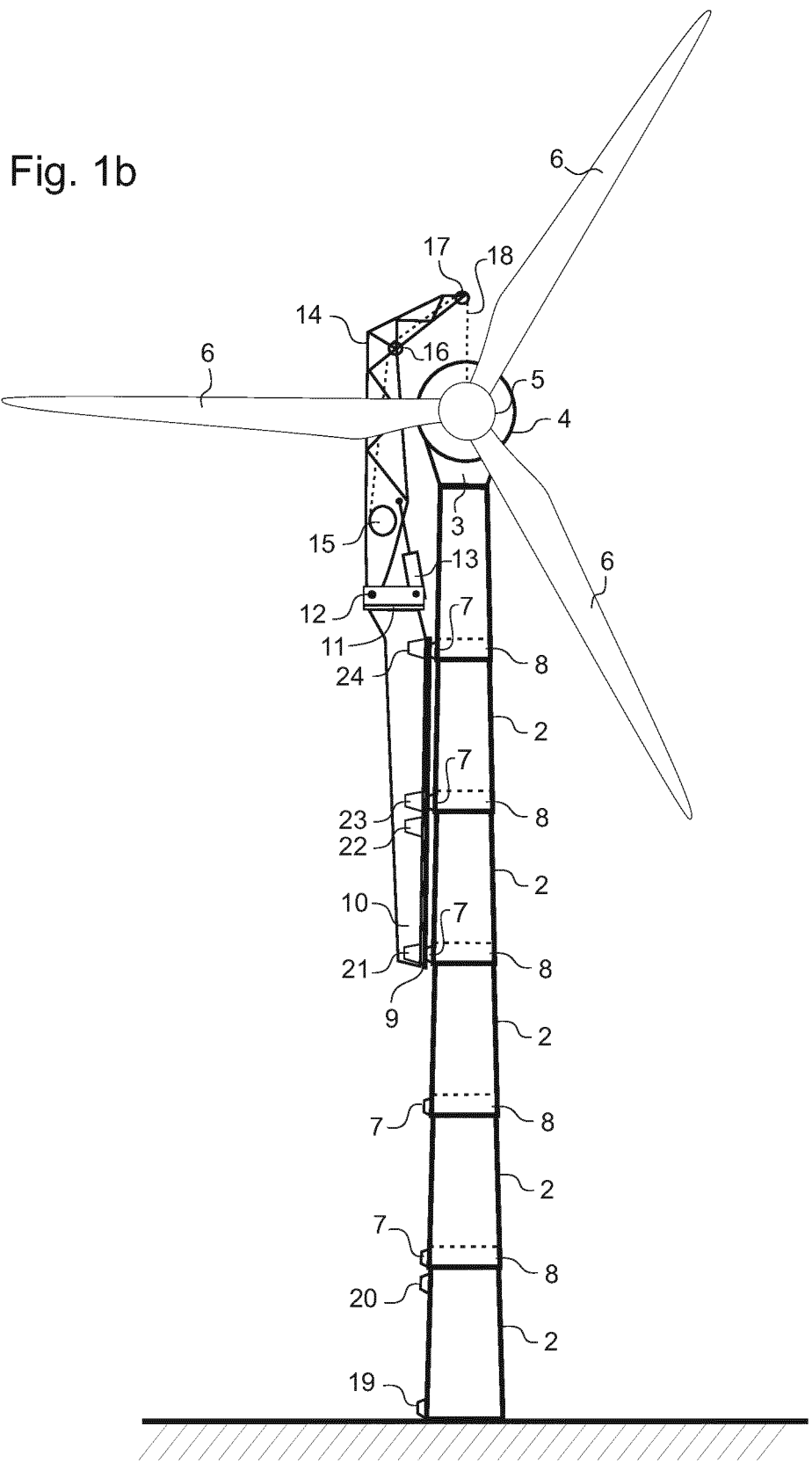
FIG. 1b: an onshore wind turbine and a hoisting system.

FIG. 1*b* shows an exemplary combination of an onshore wind turbine and a hoisting system. Except for the ground level/sea level part, the wind turbine of FIG. 1*a* may be identical to the wind turbine of FIG. 1*b*. The hoisting system in FIG. 1*a* may be identical to the hoisting system of FIG. 1*b*. The wind turbine comprises tower segments 2 which overlap in areas 8 and each have a fixation point 7, a nacelle 3, a generator 4, a hub 5 and several blades 6. The hoisting system comprises a column 10, a yawing platform 11 which carries via a tilt hinge 12 the boom 14. The boom can tilt by activation of the hydraulic cylinder 13. The hoisting cable 18 is lead via pulleys 16 and 17 to the winch 15. The hoisting system is fixed to a rail 9 which is, depending on its position, slidably attached to fixation points 7, 19 and 20, so that it can move up and down along the tower. Before hoisting is started any of the locking systems 21, 22, 23, 24 locks the rail to a fixation point.

Advantageously, the hoisting system can be releasably fixed to one side of the tower without the need for a contra weight or means for creating a contra force at another side of the tower.

Such a hoisting system is different from known hoisting systems. For example, WO2014/082176A1 discloses a rail that is attached to the tower and a lifting platform that can move up and down over said rail. This system has a drawback that the rail is required over the full length of the tower, which adds weight and increases the tower stiffness in one direction so that the tower eigen frequencies in that direction become higher than those in the perpendicular direction reducing the design freedom for modern variable rotor speed wind turbines where resonance between the tower eigen frequencies should be avoided in the full range of rotor frequencies and blade passage frequencies. Another drawback is that the lifting platform is attached to the rail over a vertical distance of about the length of one tower segment or less. This relatively short distance leads to large forces on the wind turbine tower when heavy parts like the nacelle are lifted. Furthermore, since the lifting platform moves over the entire rail length, the rail needs to be strong and heavy over the entire length and becomes expensive and economically inefficient.

Alternative lifting platforms are disclosed in U.S. Pat. Nos. 4,311,434, 6,357,549, 6,614,125 and 6,522,025, with similar disadvantages.

U.S. Pat. No. 8,069,634 discloses a first crane, which can be a large industrial crane or a crane of a ginpole type, which is moveably attached to a partially constructed structural tower of a wind turbine. The first crane is applied to hoist and install a structural tower in several parts and, once the tower is completed, to lift a second lifting system, which is installed on top of the tower and serves to hoist the nacelle and the rotor. Besides to the disadvantage of requiring two lifting systems, the application is time consuming: the first crane is to hoist the second lifting system to the top and this second lifting system is to be installed and made operational. Then the first crane is to be positioned away to avoid interfering with the second lifting system. After that the nacelle and rotor can be hoisted and when this is finished all steps need to be repeated in reversed order. A further disadvantage is that the disclosed ginpole is not resistant to sideward wind loading: the tall crane has one or two slender beamlike joints to the tower which cannot take the sideward wind load so that the entire crane could spin around the vertical axis. A further disadvantage of the disclosed ginpole moving system is that the system employs one or more standoff brackets for fixation of a jump rack slidably to the wind turbine tower. The ginpole is also connected slidably to the jump rack. Moving the ginpole is a stepwise procedure wherein each step consists of installing successive standoff brackets to the wind turbine tower, shifting the jump rack so that it overlaps with the successive standoff brackets and subsequently sliding the ginpole over the jump rack.

A similar ginpole solution with similar disadvantages is disclosed in DE-G9414643.8, which operation is time consuming and not cost-effective.

It should be noted that the erection of a wind turbine requires a period of calm weather and in particular low wind speeds. If the hoisting takes much time the probability of completing the job in the low wind period is reduced which further decreases efficiency.

US2015/0048043A1 discloses another comparable lifting system, wherein, after completion of the tower, a crane is installed on the tower top to hoist the nacelle and rotor. This system has the disadvantages that it applies a winch at the tower bottom which acts as a counter weight, resulting in the downward forces on the tower top to be about double, and long cables are required. Furthermore this system cannot lift tower segments, so that a large conventional crane is still required.

An alternative method to install a wind turbine is by designing the nacelle of the wind turbine in such a way that it comprises a hole which encloses a non-tapered tower as disclosed e.g., in US756216, DE2823525B1, DE2735298A1 and U.S. Pat. No. 6,408,575. Although the so-called Growian, a wind turbine of 100 m in height, was made using this method, it turned out to be not efficient for large wind turbines: the large turbines require tapered towers to deal efficiently with the high bending moments. Therefore non-tapered towers have phased out for wind turbines with an axis height of above about 80 meters.

Known wind turbine towers are typically of the tapered structural type or of the tapered tubular type and sometimes the lower side of the tower is structural and the upper side tubular. Structural towers are known to be transported in parts and assembled at the side. The appearance of tubular towers is generally better publicly accepted. Tubular towers protect the equipment inside the turbines such as the inverter, transformer and controller against the outdoor climate. Therefore, a solution for efficient installation of wind turbines is more relevant for tubular towers than for structural towers.

It should be noted that tubular towers are defined as towers of which horizontal cross sections are closed curves, which can be circular, polygonal, or of any other closed shape.

In DE19741988A1 and DE19647515A1 alternative lifting systems are disclosed, wherein the lifting systems can climb tubular towers by fixing itself by a system that surrounds the tower. Those systems easily damage the tower since large holding forces are needed to obtain sufficient friction on the tower wall to avoid the systems from gliding downwardly. Furthermore, these systems are most suitable for non-tapered towers which have phased out and these systems are not designed for carrying heavy parts of large modern wind turbines since the vertical length over which the bending moments are fed into the tower is less that the length of one tower segment or less than two tower top diameters which leads to unacceptable high forces on the tower wall.

Since wind speed increases with height, and the average hub height of wind turbines increases with the successive wind turbine generations, the hoisting is getting increasingly hindered by high wind speeds. In particular this is relevant to the hoisting of the entire rotor, i.e., the hub and the blades in a single hoist: the large aerodynamically shaped blades are sensitive to gusts. The lifting devices of the above prior art are typically designed for single hoist lifting of the rotor and are not suitable for single blade hoisting and in particular not for the single blade hoisting in an about horizontal position.

Figure 2:
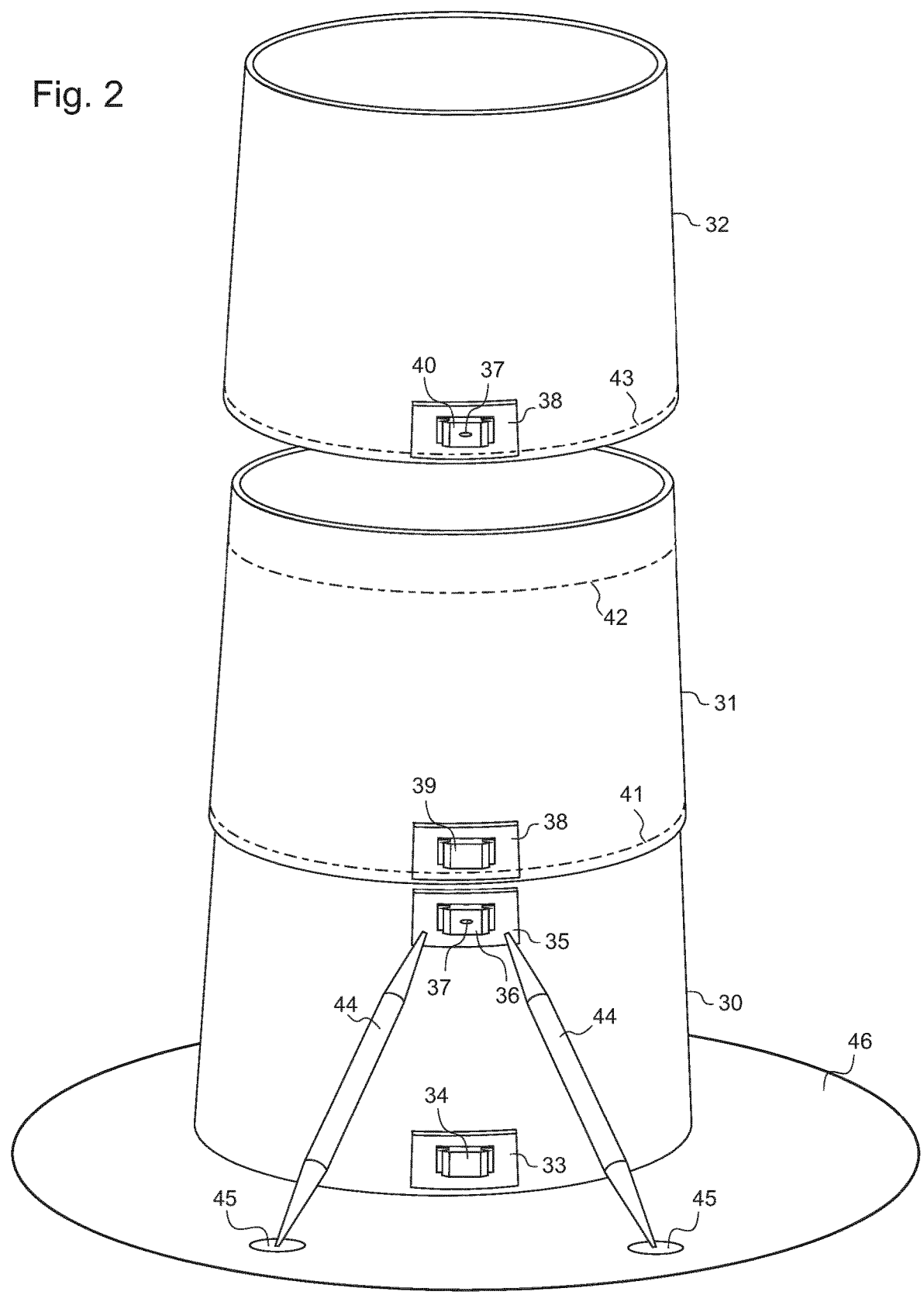
FIG. 2: tower segments of a wind turbine.

FIG. 2 shows the first three tower segments 30, 31 and 32 of an exemplary wind turbine of the present invention. Segment 32 is elevated for illustrative reasons. Segment 30 comprises the fixation points 34 and 36 with respectively stiffening structures 33 and 35. Segments 31 and 32 comprise fixation points 39 and 40 with stiffening structures 38. Fixation points 36 and 40 comprise a hole 37 which is used for locking the hoisting system to the installed tower segments. The supporting beams 44 are fixed to stiffener 35 and to fixation means 45 which are fixed to the tower foundation 46. The dashed lines 41, 42 and 43 illustrate positions of the connection between the tower segments which, e.g., can be bolted together. In this example the stiffeners 33, 35 and 38 are also bolted to the tower segments.

According to an installation method according to the invention a general purpose crane installs the first tower segment 30. Then the hoisting system is installed to the fixation points 34 and 36 of this first tower segment 30. The hoisting system uses locking system 22 to lock itself to hole 37 of fixation point 36. Then it hoists tower segment 31 on top of segment 30 and during this hoist the fixation point 39 is placed in the rail 9. The segments are bolted together and the hoisting system hoists segment 32 similarly on top of segment 31 and subsequently hoists the fourth segment. Then the hoisting system unlocks, moves upwardly and locks with locking system 23 to fixation point 37 of segment 32 so that it can hoist segment 5. This continues until the entire tower is installed. The hoisting system subsequently hoists and installs the nacelle, generator, hub and the blades, where several combined hoisting operations can be beneficial, e.g., the nacelle and generator or the entire rotor comprising the hub and the blades or even the combination of the nacelle, the generator and the rotor in a single hoist.

Figure 3:
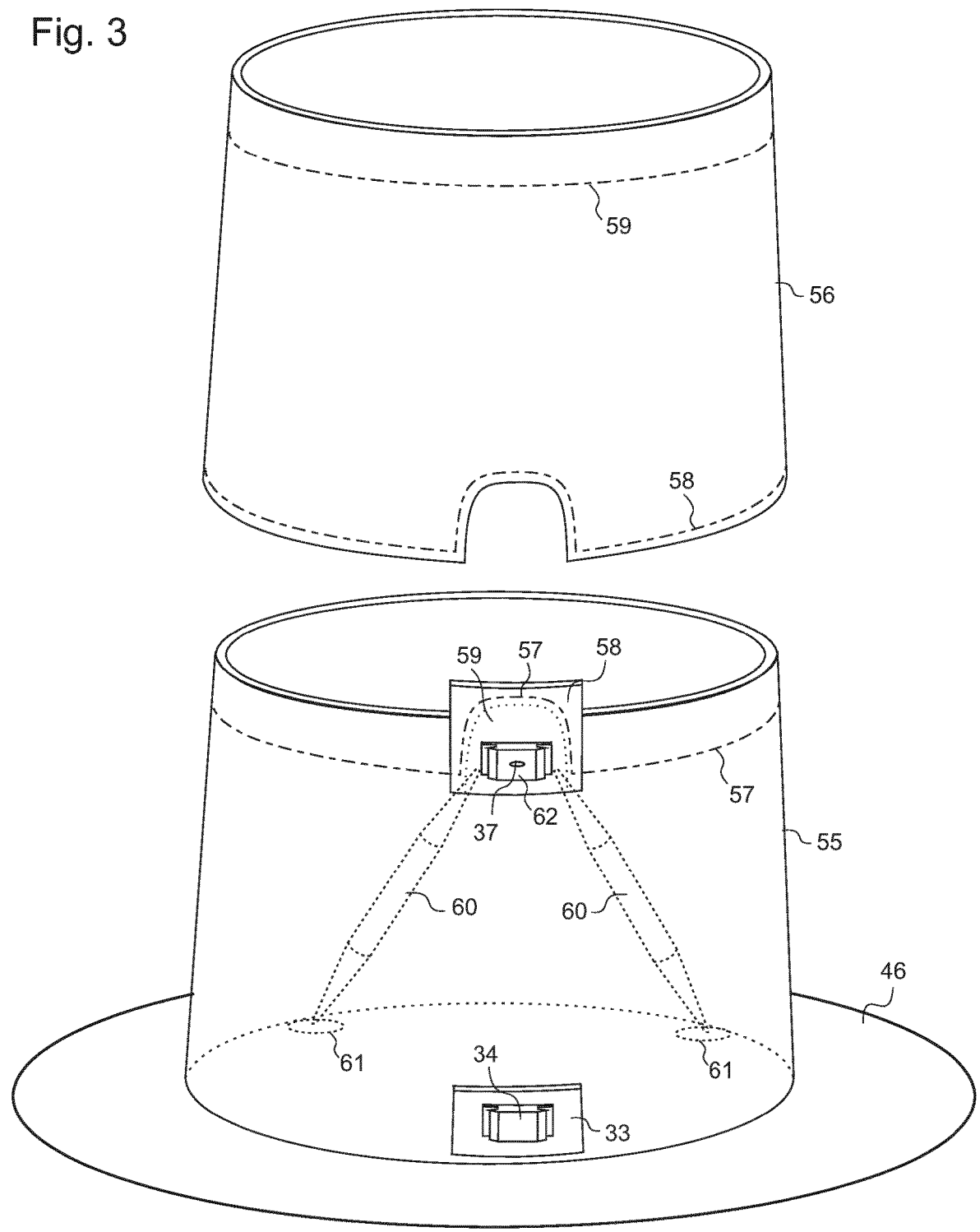
FIG. 3: tower segments of a wind turbine.

FIG. 3 illustrates another embodiment of the first two tower segments 55 and 56 where segment 55 has two fixation points 34 and 62. Fixation point 62 is installed on stiffener 58 which is placed via plate 59 (shown by a dashed line) to the tower wall. Plate 59 has the same thickness as the wall of tower segment 56, so that this segment fits precisely between segment 57 and stiffener 58. The dashed lines 57 and 58 illustrate the positions for a bolted connections. In practice the bolts can be placed in multiple lines per connections which is not shown for illustrative reasons. Fixation point 62 is supported by beams 60 which are fixed to supports 61 on the inner side of the tower. The embodiment of FIG. 2 can also be combined with supporting beams on the inner side of the tower and that of FIG. 3 can be combined with supporting beams on the outside of the tower. In the embodiment of FIG. 3 the locking system 22 is optional.

Figure 4:
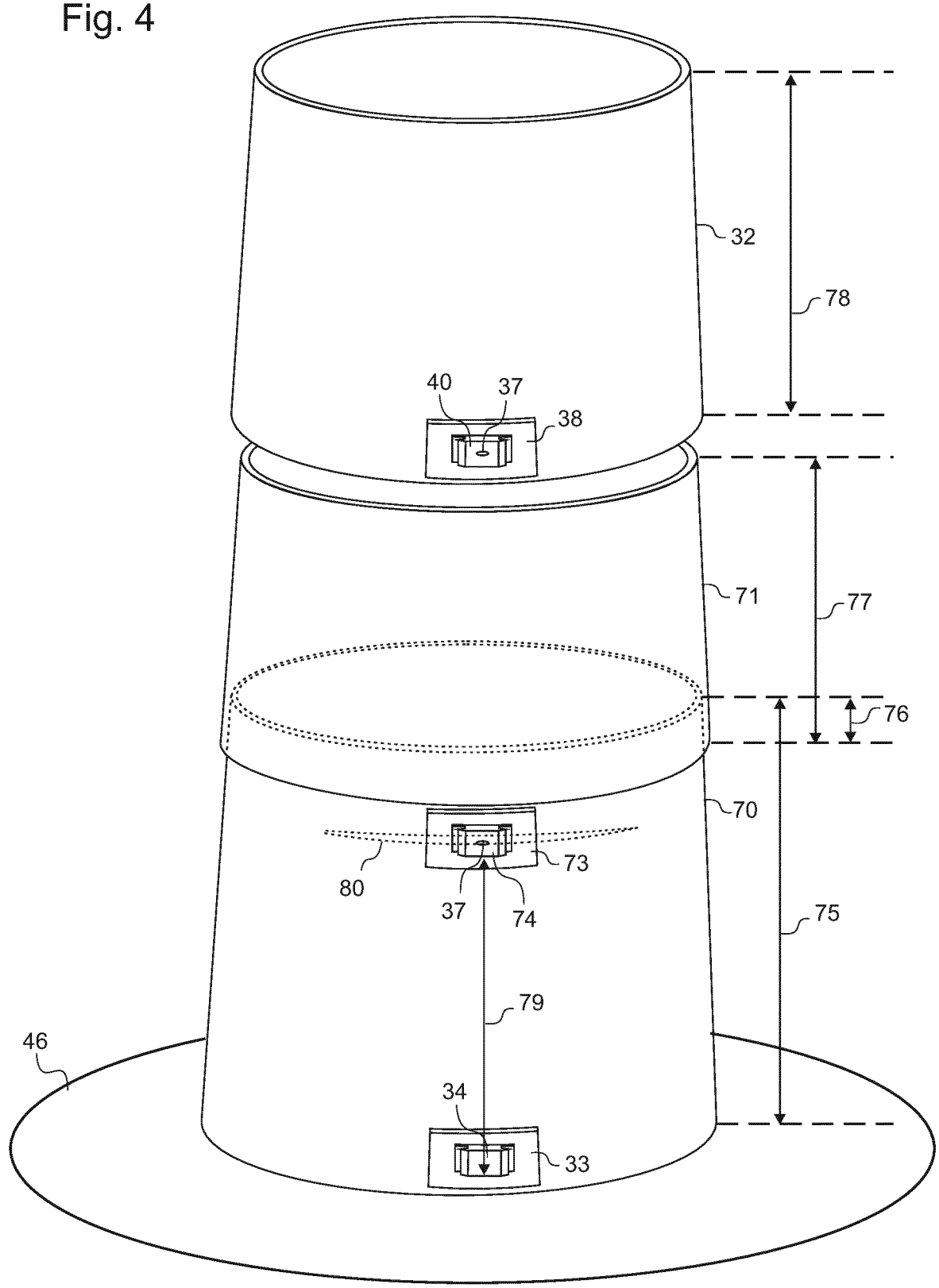
FIG. 4: tower segments of a wind turbine.

FIG. 4 illustrates another embodiment of the first tower segments 70, 71 and 32 of a wind turbine. In this case segment 32 and the higher segments which are not shown have a standard length 78 which can be transported easily, e.g., a length between 10 m and 16 m such as, e.g., 12 m. The tower segments overlap over a distance 76 which is, e.g., 0.5 m, so that the tower height increases 11.5 m per standard segment. For the hoisting system it is beneficial when the fixation points always have the same vertical spacing 79, e.g., one fixation point per 11.5 m. By increasing the length 75 of the first tower segment 70 it can comprise two fixation points at a spacing of 11.5 m and still sufficient length is left for the overlap 76 with tower segment 71. This enables to attach the hoisting system to segment 70 and subsequently to hoist segment 71 and 32, without the need of the special structure with plates 58 and 59 in FIG. 3. A consequence is that segment 75 requires a longer transport length. Segment 71 has a shorter length 77 and does not carry a fixation point. Fixation point 74 has a stiffening structure 73 on the outer side of the tower and a stiffening structure 80 on the inner side of the tower.

Figure 5:
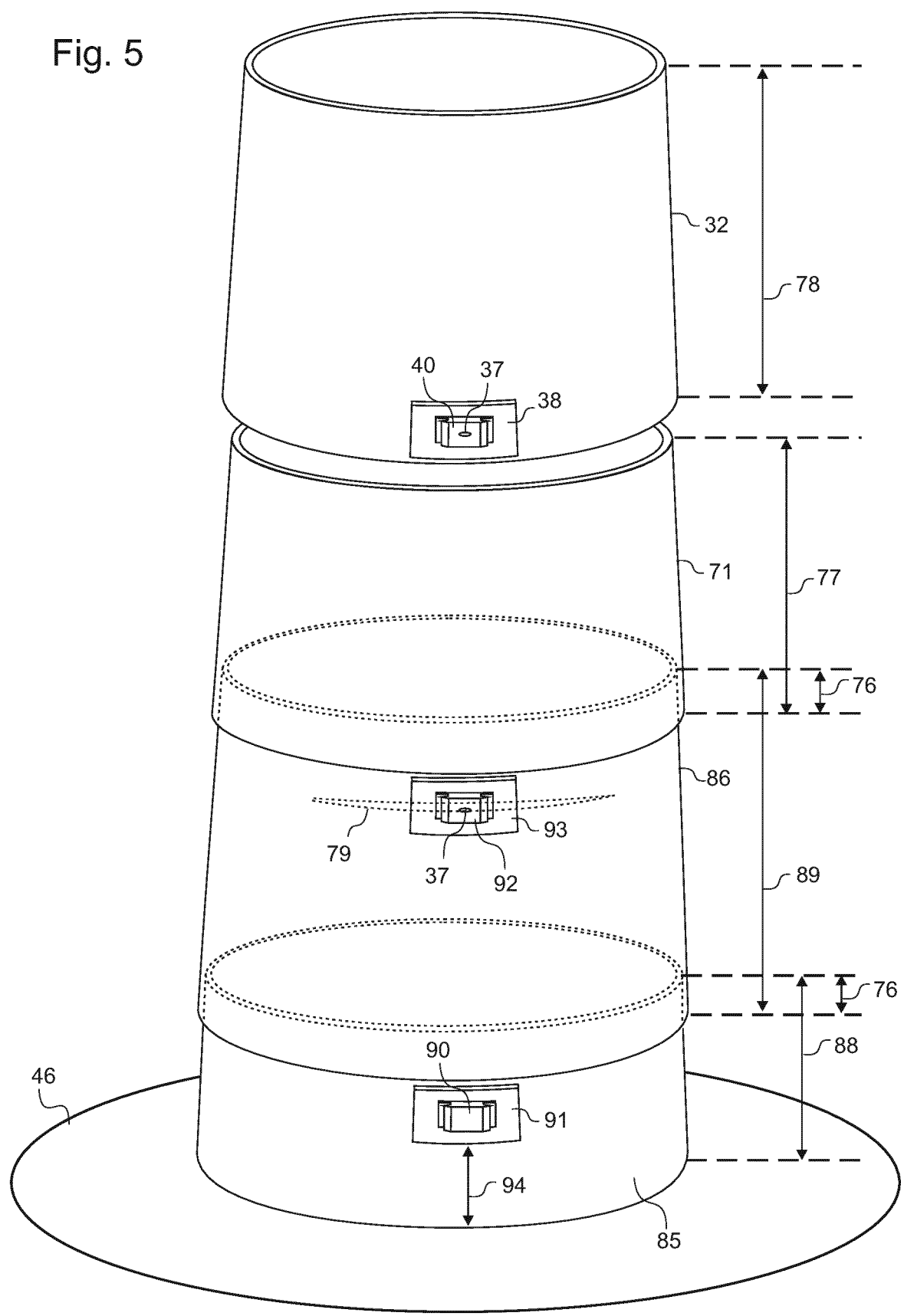
FIG. 5: tower segments of a wind turbine.

FIG. 5 illustrates another embodiment of the first tower segments. In this embodiment the first tower segment 85, which also could be an integrated part of the tower foundation 46, comprises the first fixation point 90 with stiffener 91 at a distance 94 from the foundation. The second segment 86 comprises a fixation point 92 with stiffener 93 and similar to FIG. 4 an internal stiffener 79. This embodiment has the advantage that the first, second and third segments can have equal or shorter lengths, respectively 88, 89 and 77, compared to the length 78 of the fourth segment 32, which can be the maximum transport length of all segments.

Figure 6:
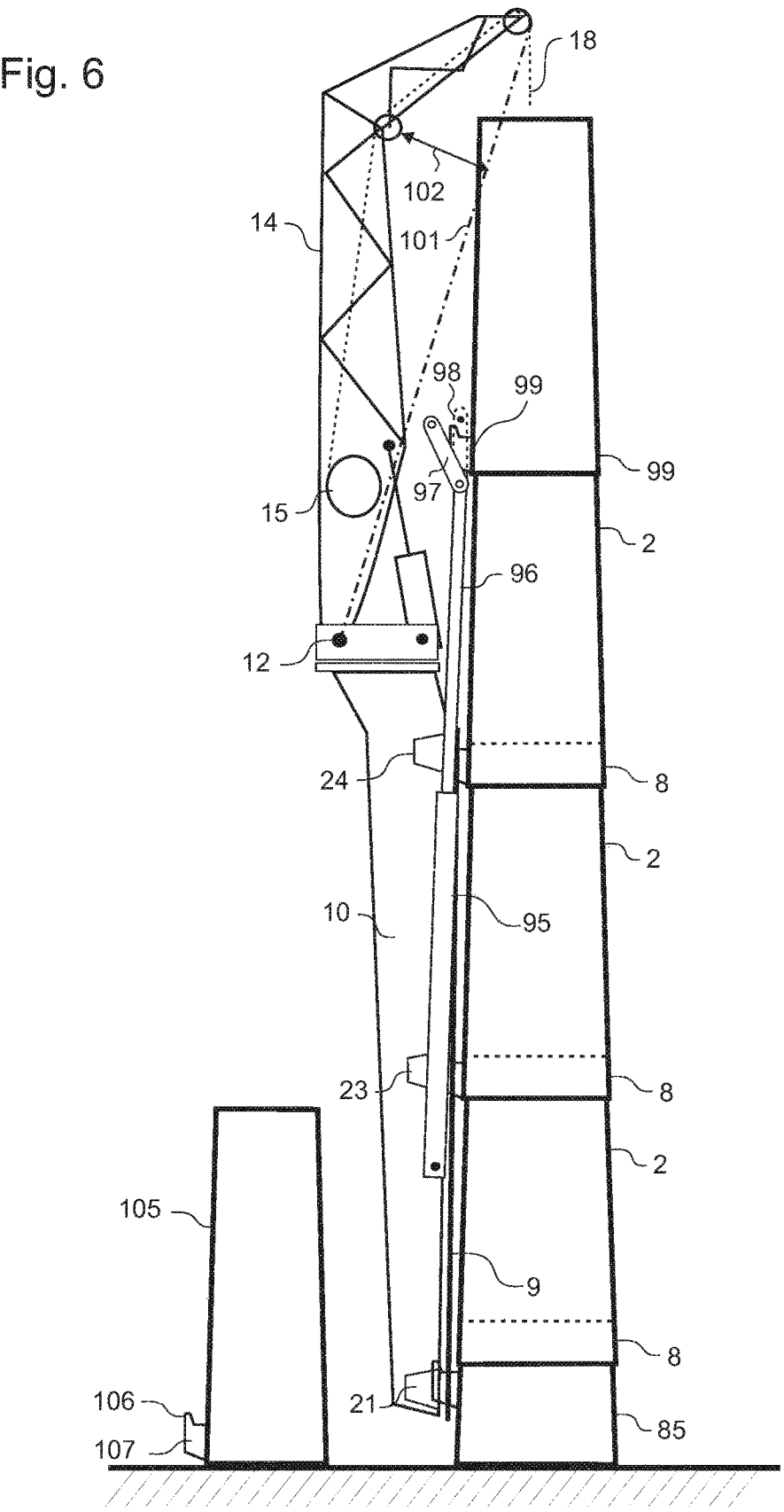
FIG. 6: a wind turbine under construction and a hoisting system.

FIG. 6 shows an exemplary hoisting system and exemplary first tower segments in more detail compared to FIG. 1. The column of the hoisting system comprises a hydraulic cylinder 95 with piston 96 and an actuator in a state 97 so that it can pass a fixation point 99 and in a state 98 wherein it connects to fixation point 99. The hoisting system can move up after the actuator is in state 98 and is locked to fixation point 99 on tower segment 103 and the hydraulic cylinder 95 is actuated until the weight of the crane is carried by the hydraulic cylinder. Then the locking systems 21, 23 and 24 are unlocked, where it should be noted that although FIG. 6 illustrates three locking systems, any number of locking systems larger than zero is possible. Then the hydraulic cylinder 95 is further activated so that piston 96 is pulled into cylinder 95 so that the hoisting system moves upwardly. The upward movement continues until any locking system reaches a fixation point whereon it can be locked and the weight of the hoisting system can be transferred from the hydraulic cylinder 95 to the locking system.

It should be clear that also two cylinders are possible: each at one side of the column or even multiple cylinders, e.g., cylinders which push the hoisting system upwardly instead of pulling it upwardly.

FIG. 6 also shows that due to the inflection of the boom, the boom reaches a distance 102 to the line segment 101 between the center of the tilt hinge and the hoisting point.

FIG. 6 further illustrates another tower segment 105 which still has to be hoisted. The segment comprises a fixation point 107 with edge 106 which serves to capture actuator 98.

Figure 7:
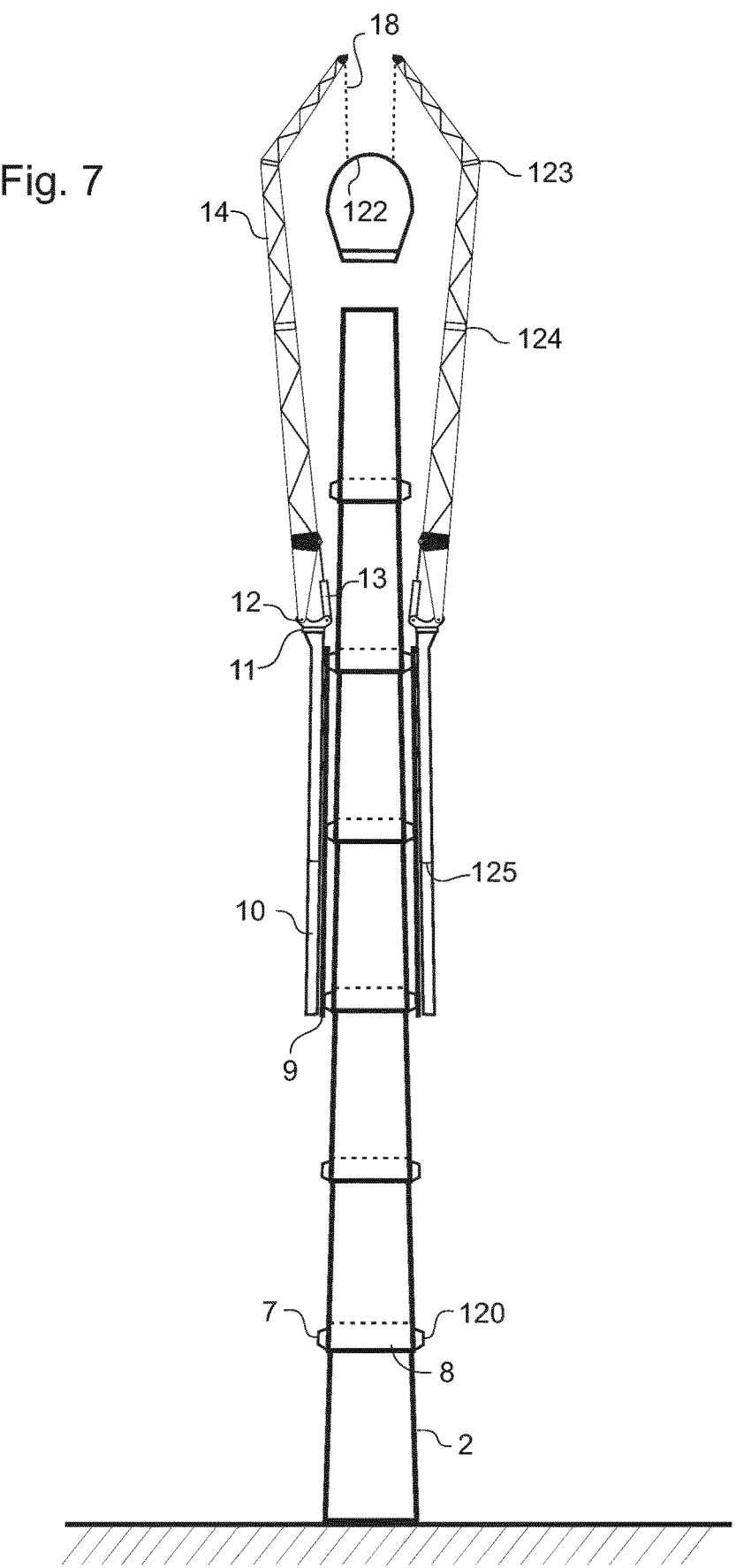
FIG. 7: a wind turbine under construction with two hoisting systems.

FIG. 7 shows an exemplary wind turbine tower under construction with two exemplary hoisting systems on opposite sides of the tower. In FIG. 7 only the bottom tower segment 2 with overlapping part 8, fixation point 7 and additional fixation point 120 is shown with reference numbers for illustrative reasons. The higher tower segments are similar to the bottom tower segment. The hoisting system shown on the left hand side of the tower with rail 9, column 10, yaw bearing 11, tilt hinge 12, tilting actuator 13, boom 14 and hoisting cable 18 is similar to the second hoisting system shown on the right hand side. The hoisting systems together can advantageously be used for the hoisting of heavy parts such as, e.g., the nacelle 122. Another advantage of two hoisting systems is that the hoisting of some parts, like the blade or the rotor, is less sensitive to wind gusts and more stable when using two cables, i.e., one cable from each hoisting system.

Most tower segments in the embodiment of FIG. 7 have two fixation points 7 and 120, i.e., one fixation point for each hoisting system. The two fixation points 7 and 120 may be positioned at any angle difference of at least 20 degrees in a cylindrical coordinate system around a tower center axis. In FIG. 7 the two fixation points 7 and 120 are located on opposite sides of the tower segment, i.e., at an angle difference of 180 degrees. In an alternative embodiment a first hoisting system is installed to the tower and climbs upwardly and subsequently installs a second hoisting system immediately at an elevated location suitable to hoist heavy parts. In the latter alternative embodiment the second hoisting system cannot climb or can only climb over a limited range so that not all tower segments need a second fixation point 120. The second hoisting system may be similar to the first hoisting system or may have a different layout. For example it may not comprise a climbing system or have a different boom.

FIG. 7 further illustrates two positions 123 and 124 where the boom 14 may have joints and position 125 where the column 10 may have a joint. At those joints the hoisting system may be folded or taken apart to facilitate transportation.

Figure 8:
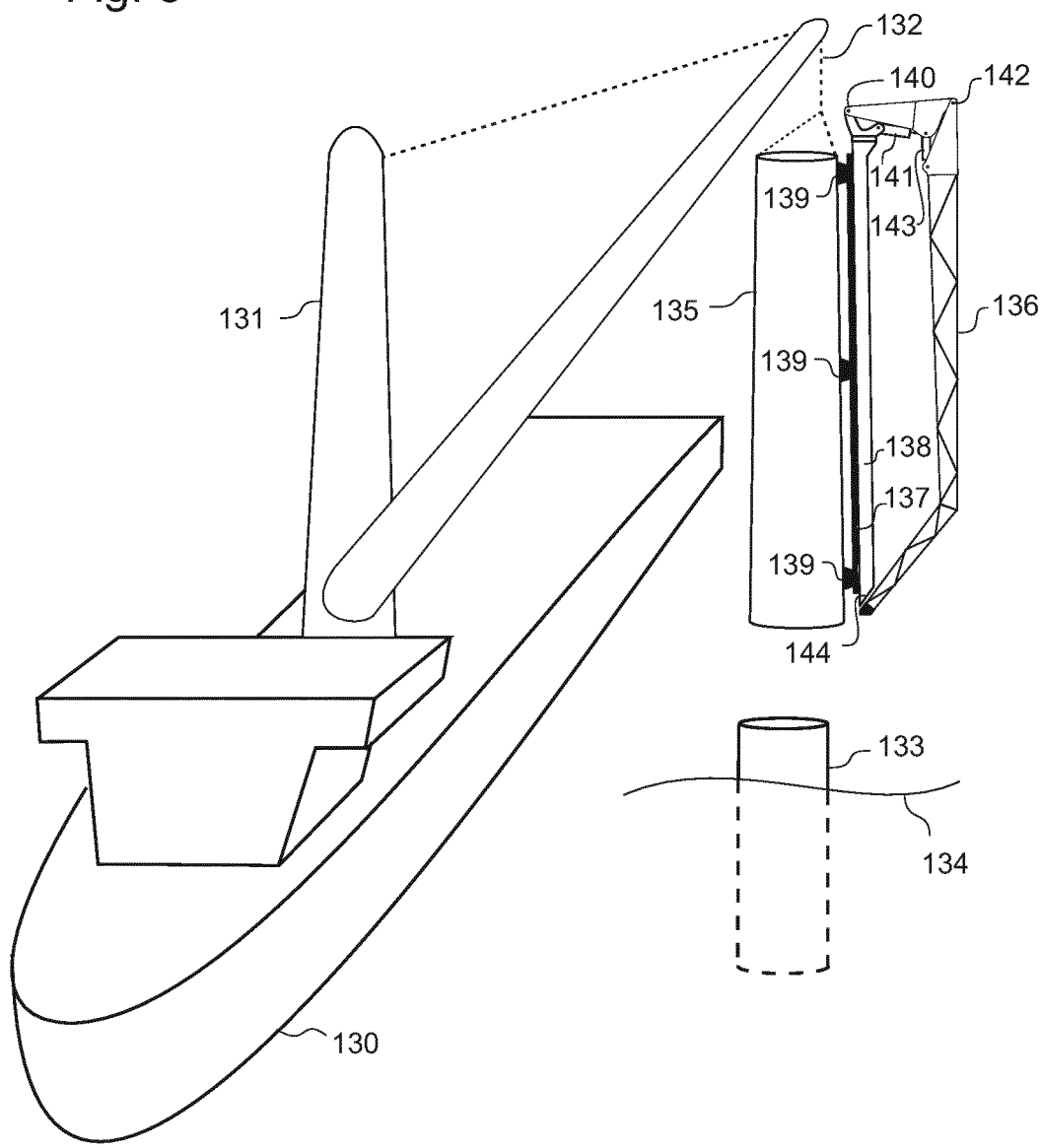
FIG. 8: installation of a hoisting system for an offshore wind turbine.

FIG. 8 shows an exemplary offshore wind turbine under construction. A vessel 130 with crane 131 uses a cable 132 to hoist a segment 135 of the tower of the offshore wind turbine. The segment 135 is for example a transition piece whereto an exemplary hoisting system with boom 136, rail 137, column 138 and fixation points 139 is attached. The hoisting system has, similar to the above exemplary embodiments, a tilt hinge 140 with actuator 141, but also may have a second tilt hinge 142 with a second tilt actuator 143 which are arranged so that the boom can fold to the column where the tip of the boom is connected at location 144 to the column to obtain a better structural stability. A relatively low cost vessel can be used to install the tower segment with the hoisting system in a single hoist on the foundation 133 of the offshore wind turbine.

In the example of FIG. 8 the foundation 133 is a monopile support structure which passes the sea level 134. Once the hoisting system is installed, it can pick up the subsequent tower segments and the other parts of the wind turbine from the same or another vessel and build the offshore wind turbine. The hoisting system can subsequently be removed or it stays on the turbine for maintenance work or for the replacement of parts of the wind turbine or for decommissioning of the turbine. An advantage of using the hoisting system on an offshore wind turbine is that the installation of parts of the turbine is cheaper than the conventional method wherein said parts are installed by a jack-up vessel. The hoisting system is even more convenient since it is attached to the tower under construction and therefore follows its movements.

Figure 9:
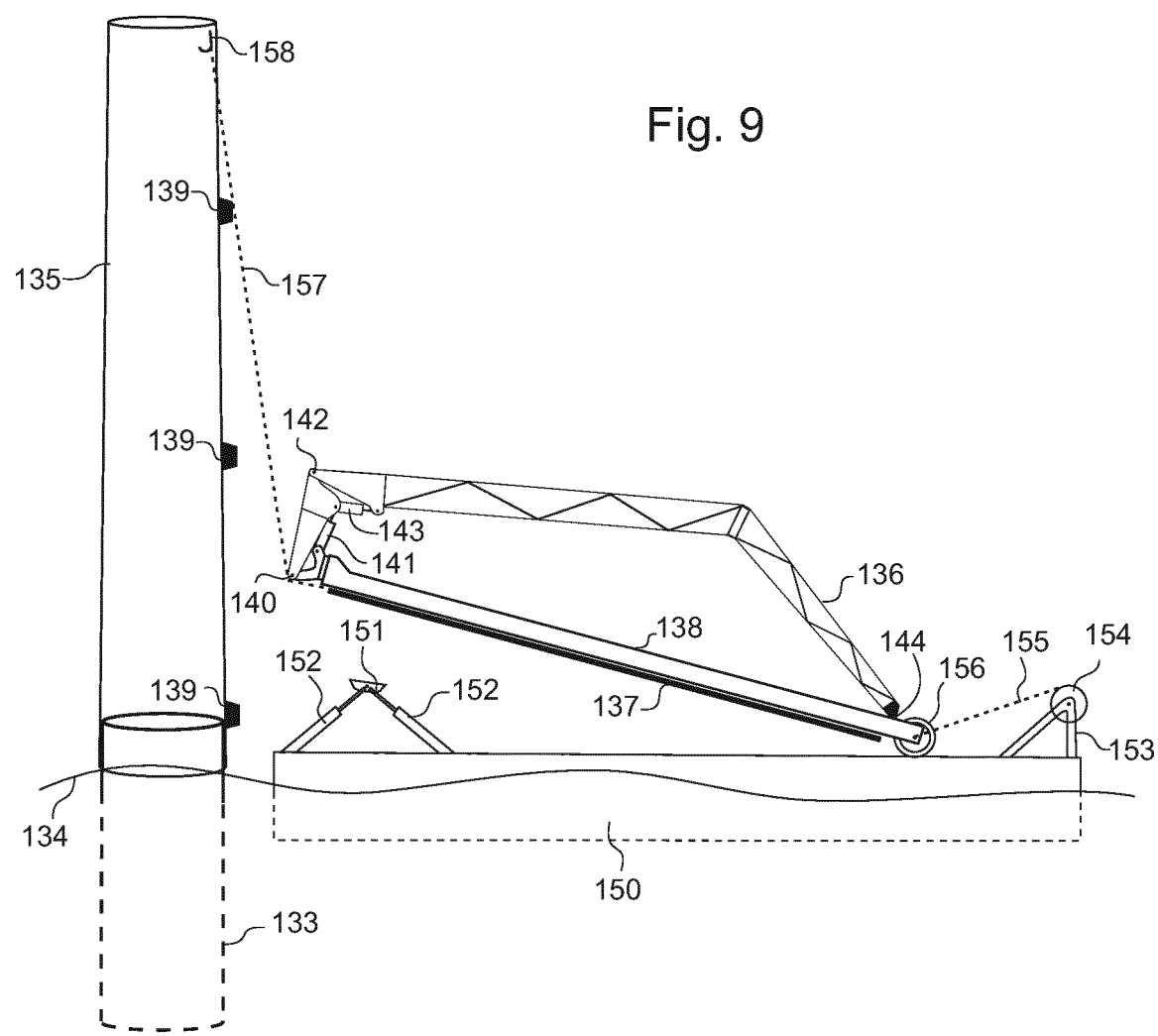
FIG. 9: installation of a hoisting system for an offshore wind turbine.

FIG. 9 shows an alternative exemplary combination of an offshore wind turbine and a hoisting system. In this embodiment the hoisting system is hoisted with cable 157 from pontoon 150. Before the hoisting system is elevated, it may be placed on foot 151 which is arranged to stabilize the hoisting system for motion of the pontoon by waves. Foot 151 is, e.g., placed on hydraulic cylinders 152 for stabilization and to lower the support completely below deck level, so that the other side of the hoisting system supported by wheel 156 can pass over it. While cable 157 hoists the system upwardly the cable 155 is released by winch 154 on support 153. This continues until the hoisting system is almost parallel to the tower. At a certain moment wheel 156 comes free from the deck and cable 155 is further released until wheel 156 reaches the wind turbine tower. After that the system is connected to the fixation points and performs the further completion of the offshore wind turbine by installing the remaining parts. Cable 157 can be pulled upwardly by a separate winch but also by the winch installed in the boom of the hoisting system, for example by guiding the hoisting cable from point 144 via the column 138 to the hook 158.

Figure 10:
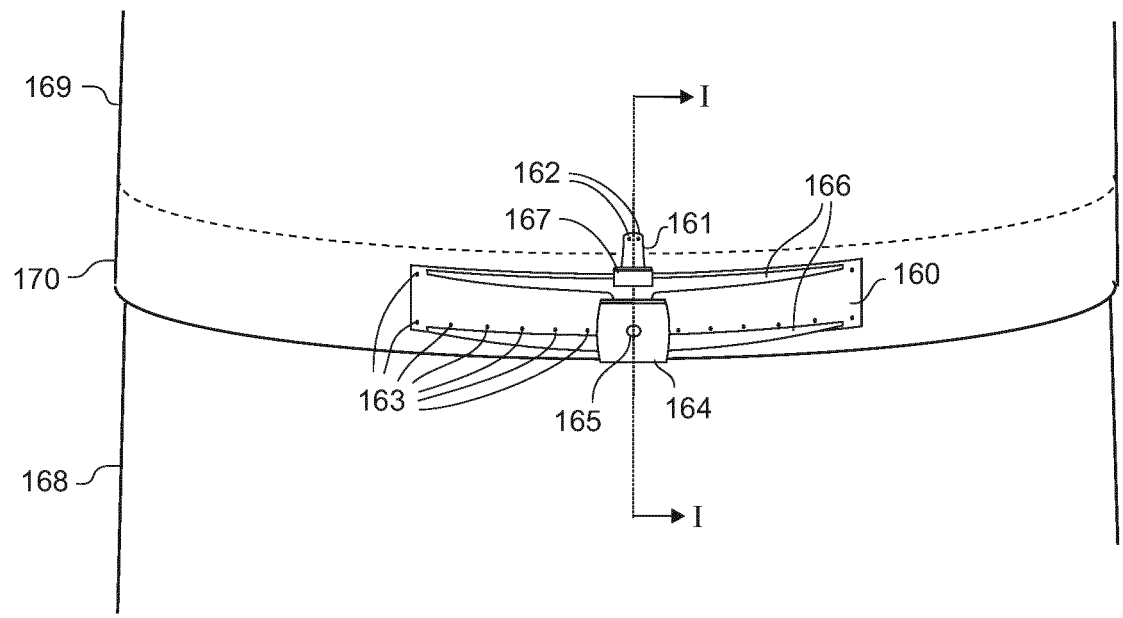
FIG. 10: a fixation point on a wind turbine tower.

FIG. 10 shows an exemplary fixation point 160 in more detail. With protuberance 161 the fixation point can be installed with bolts 162 to the upper tower segment 169, so that this element can be hoisted together with the fixation points and installed on top of segment 168 where it is further fixed with bolts 163 in the overlap range 170. The element 164 is arranged to fit into the rail of the hoisting system and hole 165 serves for locking to the rail. Ribs 166 may be used to distribute the loads over a large part of the tower. Note also that only some of the bolts of the fixation points are drawn and those for the further connection of the upper and lower segments in the overlap zone 170 outside of the fixation point are not drawn. Element 167 is arranged to connect to the hoisting system and to carry the majority of the vertical loads during hoisting operations. It is installed close to the tower wall so that the vertical forces have a small arm and therefore exert a relatively small bending moment to the fixation point.

Figure 11:
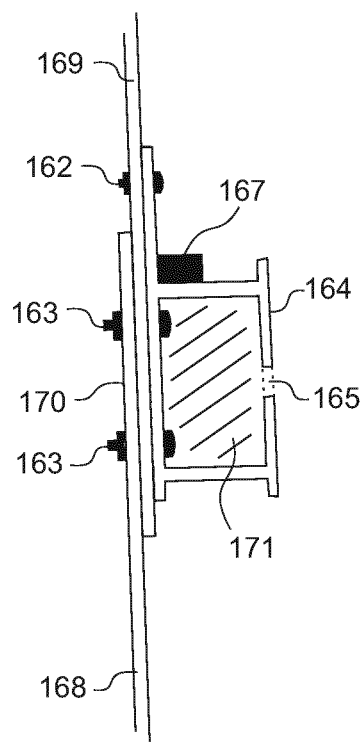
FIG. 11: cross section of the fixation point in FIG. 10.

FIG. 11 shows cross section I-I of the fixation point in FIG. 10. From this side also stiffening plate 171 is visible.

Figure 12:
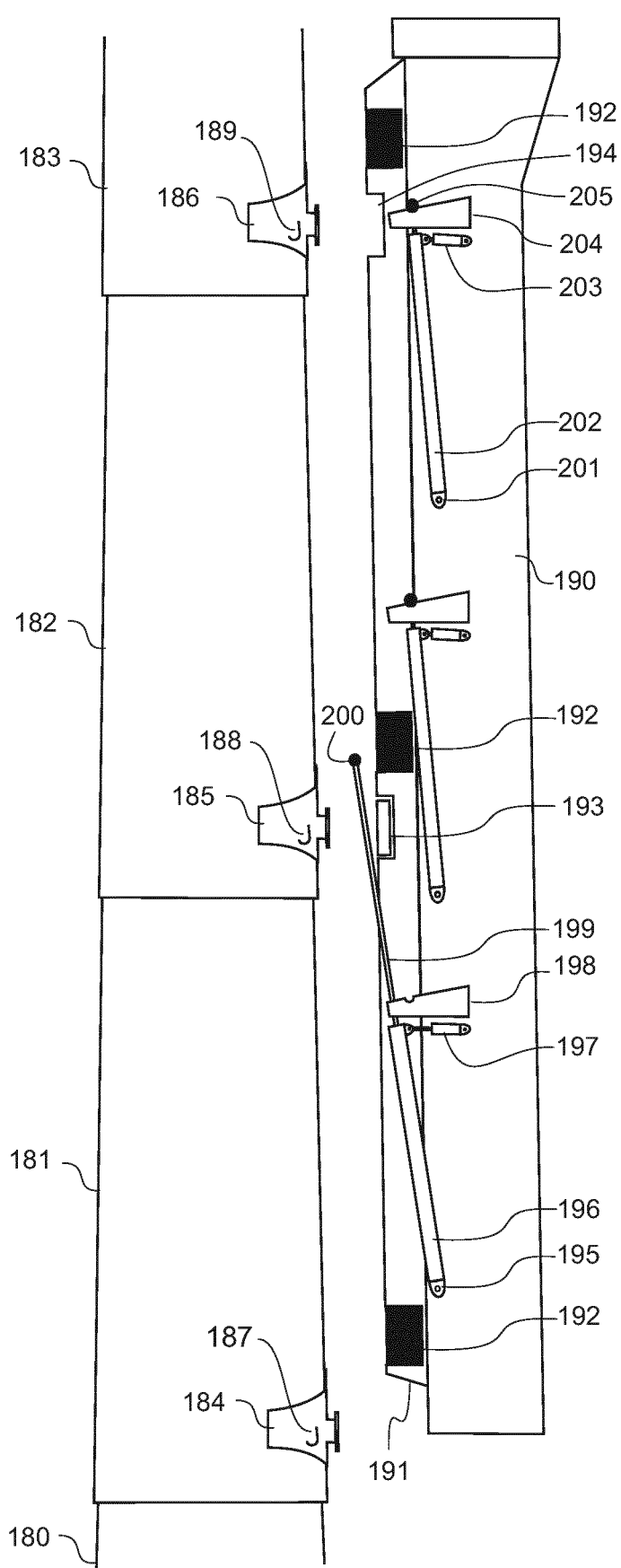
FIG. 12: a column of a hoisting system with three climbing systems.

FIG. 12 shows a combination of an exemplary wind turbine tower with a column of an exemplary hoisting system. The tower comprises segments 180, 181, 182, 183 of which the upper three have respectively fixation points 184, 185, 186 and hooks 187, 188, 189. Of the hoisting system only the column 190, the rail 191, a closed rail door 193, an opened rail door 194, fixation systems 192 and three hydraulic climbing systems are shown. For illustrative reasons the hoisting system is shown in a position wherein it can connect to the rail by moving the system towards the tower. The upper rail door 194 is open so that the fixation point 186 can move into the rail. The lower door 193 is shown in closed position for illustrative reasons, but will be open to connect to fixation point 186. When the fixation points 185 and 186 have entered the rail, the hoisting system can move downwardly so that also fixation point 184 enters the rail. Subsequently the doors 193 and 194 are closed and the system can be locked by one or more fixation systems 192.

In the exemplary embodiment of FIG. 6 the hoisting system included a climbing system with a hydraulic cylinder 95 with piston 96 and an actuator in states 97 and 98 for connecting to fixation point 99. The exemplary hoisting system of FIG. 12 includes an alternative climbing system that uses hooks next to the fixation points for climbing the tower.

In the embodiment of FIG. 12 the column is provided with three hydraulic climbing systems. The lower hydraulic climbing system comprises main cylinder 196 which is rotatably fixed with one end 195 to the column. The other end is guided through rail 198 by actuator 197. In FIG. 12 the piston 199 is fully extended and has a spherical end 200 which fits into any of the hooks, e.g., hook 188. When the column is unlocked from the fixation points and the lowest hydraulic climbing system is hooked on, it can pull the hoisting system upwardly over about one third of the distance between the successive fixation points. Then the mid hydraulic climbing system can extend its piston, connect it to hook 189 and pull the hoisting system further upwardly, after the lowest hydraulic climbing system is disconnected. The last step is performed by the highest hydraulic climbing system with hydraulic cylinder 202 which is connected at point 201 to the column and at the other end guided through rail 204 by control actuator 203. This highest hydraulic climbing system completes the stroke to the position where a fixation system can lock again to a fixation point. In FIG. 12 the parts of the mid hydraulic climbing system are not numbered but correspond to those of the highest hydraulic climbing system.

A hoisting system with three climbing systems instead of one climbing system, wherein with each climb one third of the distance between successive fixation points is covered, has an advantage that shorter and therefore more stable and cheaper hydraulic cylinders can be used. The invention is not limited to three hydraulic climbing systems, and any number of climbing systems can be used in principle, including just one hydraulic climbing system.

Figure 13:
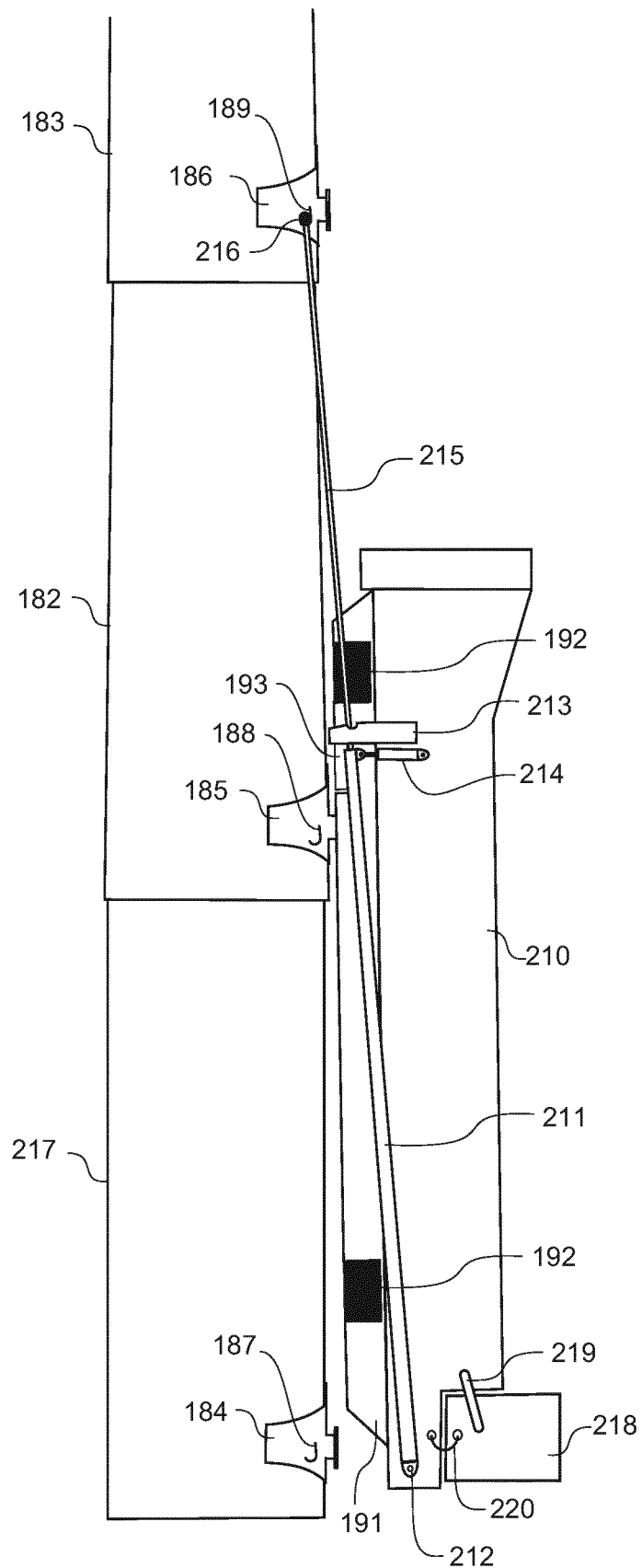
FIG. 13: a column of a hoisting system with a single climbing system.

FIG. 13 shows an alternative embodiment of a column 210 of the hoisting system. In this embodiment the length of the column extends over less than two times the distance between successive fixation points. An advantage of such a shorter system is that it is lighter and smaller, and therefore cheaper. Furthermore, since its rail can be slidably fixed by only a single fixation point during part of the climbing of the system, the system can move along towers of which the taper changes in longitudinal direction. In FIG. 13 the lowest tower segment 217 is cylindrical, while segments 182 and 183 are tapered.

In an embodiment of the hoisting system the column is arranged such that an operator has access to it. The column may have a door, one or more platforms and stairs inside so that an operator can carry out repairs and maintenance. From the inside of the column there may be inspection hatches, for example for the inspection of the fixation systems and/or climbing systems.

In an embodiment the hoisting system may have a single fixation system, for example the system of FIG. 12 only in the middle of the column and the system of FIG. 13 only at the upper end of the column.

In another embodiment of the hoisting system it may have no fixation system at all: For example the system of FIG. 12 may be executed without any of the fixation systems 192 and use the climbing systems for both climbing and fixation. The climbing systems are repeatedly activated so that always at least one climbing system connects the column to the tower. Advantages of such an embodiment are lower cost and more simplicity.

FIGS. 6, 12 and 13 show climbing systems on one side of the column. Alternative embodiments may have climbing systems on both sides of the column.

The exemplary hoisting system of FIG. 13 includes a single climbing system with a relatively long cylinder 211 fixed in a hinged manner at end 212 and guided at the other end through rail 213 by controlling actuator 214. Piston 215 is locked into hook 189 with its spherical end 216. During climbing the column 210 is pulled up by the climbing system until the rail 191 is released from fixation point 184 after which the column is slidably fixed by fixation point 185 and further fixed via the piston of the climbing system to fixation point 186. In this part of the upward stroke the column can change slightly of tilt angle so that its rail is aligned to the successive fixation point.

FIG. 13 also shows an exemplary optional power system 218 which, e.g., comprises a generator for electric and hydraulic power which are arranged such that the hoisting system can operate standalone. The power system is fixed with joint 219 and the power and control lines between the column and the power system are led via joint 220. The hoisting system can comprise a backup hydraulic pump which can be driven by electric power fed via an electric cable from the ground.

Figure 14:
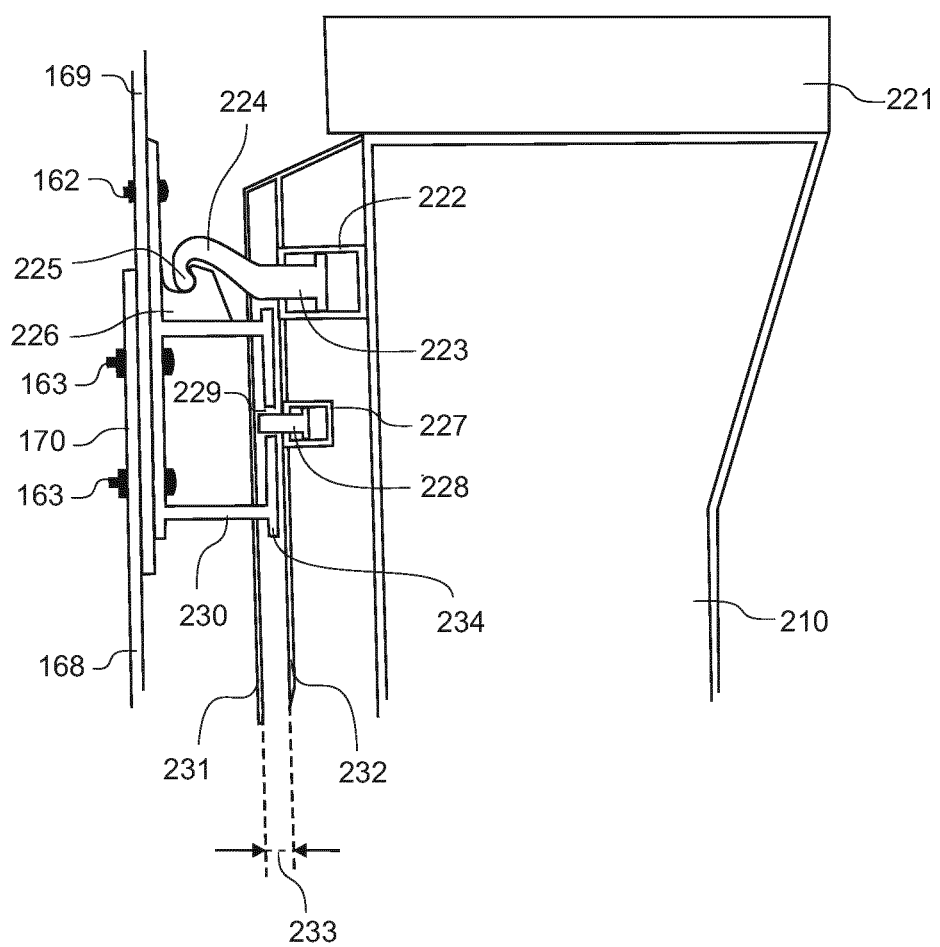
FIG. 14: a cross section of a fixation system.

FIG. 14 shows a cross section of an exemplary fixation system. On the left hand side part of two tower segments 168 and 169 are shown with a fixation point 230. On the right hand side part of the column 210 with the yaw platform 221 of a hoisting system are shown. Hydraulic cylinder 222 controls piston 223 with a hook 224 into the element 226 of the fixation point. The end 225 of the hook and element 226 together form a cylindrical hinge with the hinge axis approximately normal to the drawing plane and thus are arranged such that the column of the crane has some tilt freedom. The hook and thus also the column of the crane also has some rotational freedom of movement around the approximately horizontal axis of the piston 223. Those freedoms around the about horizontal axes avoid that large bending moments are exerted to the fixation point. During a fixation process, the column is lifted slightly first so that piston 223 can be extended. Then the column is lowered until hook 224 connects with element 226, and after that hydraulic cylinder 227 drives piston 228 in the hole 229 so that the column cannot move up or down anymore. The rail has a outside guiding strip 231 and an inside strip 232 with an mutual distance 233.

In an embodiment the thickness of plate 234 of the fixation point located is inside the rail is, e.g., 15 cm, preferably 10 cm less and for example 5 cm less and at least 1 mm more than the mutual distance 233. An advantage of having a play of for example 5 cm is that the column has a tilt freedom of about 0.25 degree which allows the taper of the tower to change by about this amount over each section. Towers of changing taper have an structural advantage and can thus be installed with an hoisting system according to the invention.

The center of a fixation point may be defined by the center of plate 234.

The pistons 223 and 228 in FIG. 14 are directly driven by the hydraulic fluid. In an alternative embodiment any of those pistons may be guided pins which are driven by separate hydraulic cylinders. An advantage of such an embodiment is that the guided pins may be better suitable for sideward loading.

In a further embodiment of the hoisting system it may not have doors in the rail. For example the hoisting systems of FIG. 12 or FIG. 13 may be made without doors 193 and 194. They still can be installed on the rail aided by some play of the fixation points in the rail. In the case of FIG. 13 first fixation point 184 is slide in the rail by moving the hoisting system downwardly and subsequently by moving the system upwardly again, the rail slides over fixation point 185. The hoisting system in FIG. 12 may be installed in a similar manner.

Figure 15:
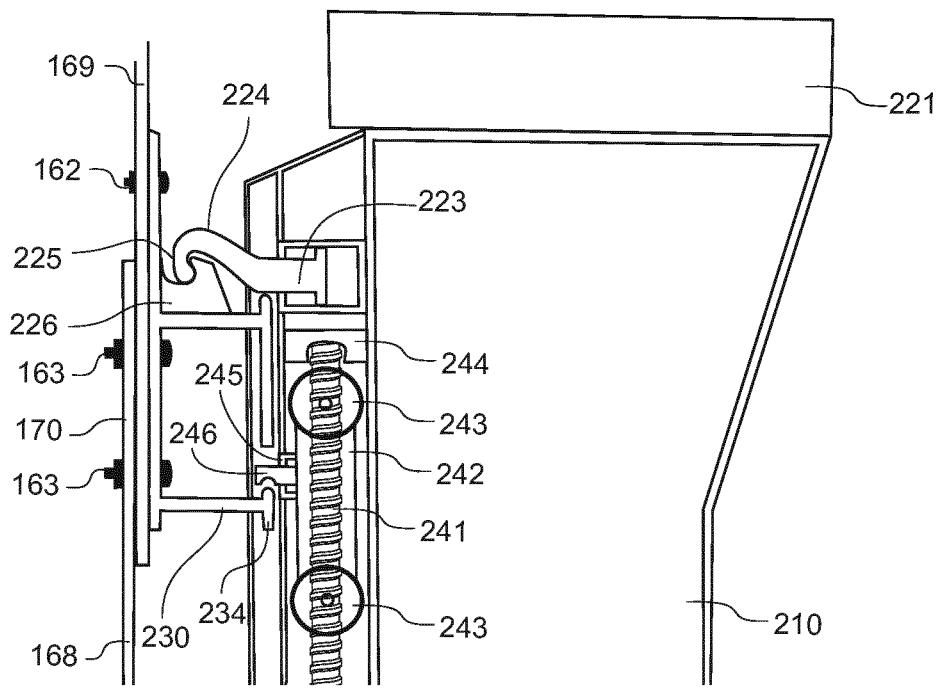
FIG. 15: a cross section of a fixation and a climbing system.
Figure 15:
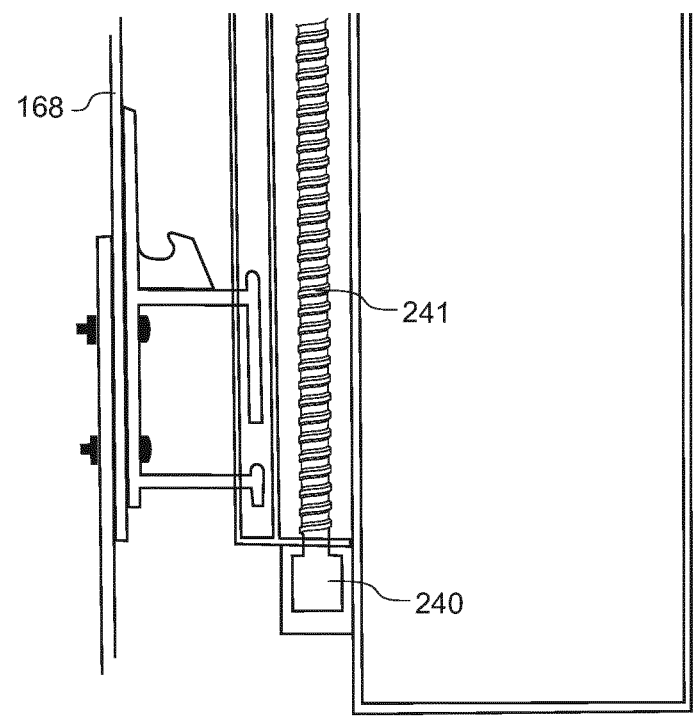

FIG. 15 shows an exemplary wind turbine tower on the left hand side and an exemplary column of a hoisting system on the right hand side. For illustrative reasons the mid part of the column was not drawn. The column comprises a wagon 242 which comprises a hydraulic cylinder 245 with piston 246 which fits in the hole in plate 234 of the fixation point 230. A spindle 241 which is driven by a hydraulic motor 240 and is further positioned by bearing 244 slides through wagon 242 and drives it parallel to the rail through the back side of the rail. When wagon 242 is locked to a fixation point and hook 224 is unlocked, the hydraulic motor will move the hoisting system up and down by rotating the spindle. Advantages of climbing by a wagon connected to a spindle is that it saves the climbing system with the hydraulic cylinders, that locking to a fixation point with piston 246 is simpler than connecting to the hooks 187, 188, 189 and that the wagon is a relatively stable option.

Figure 16:
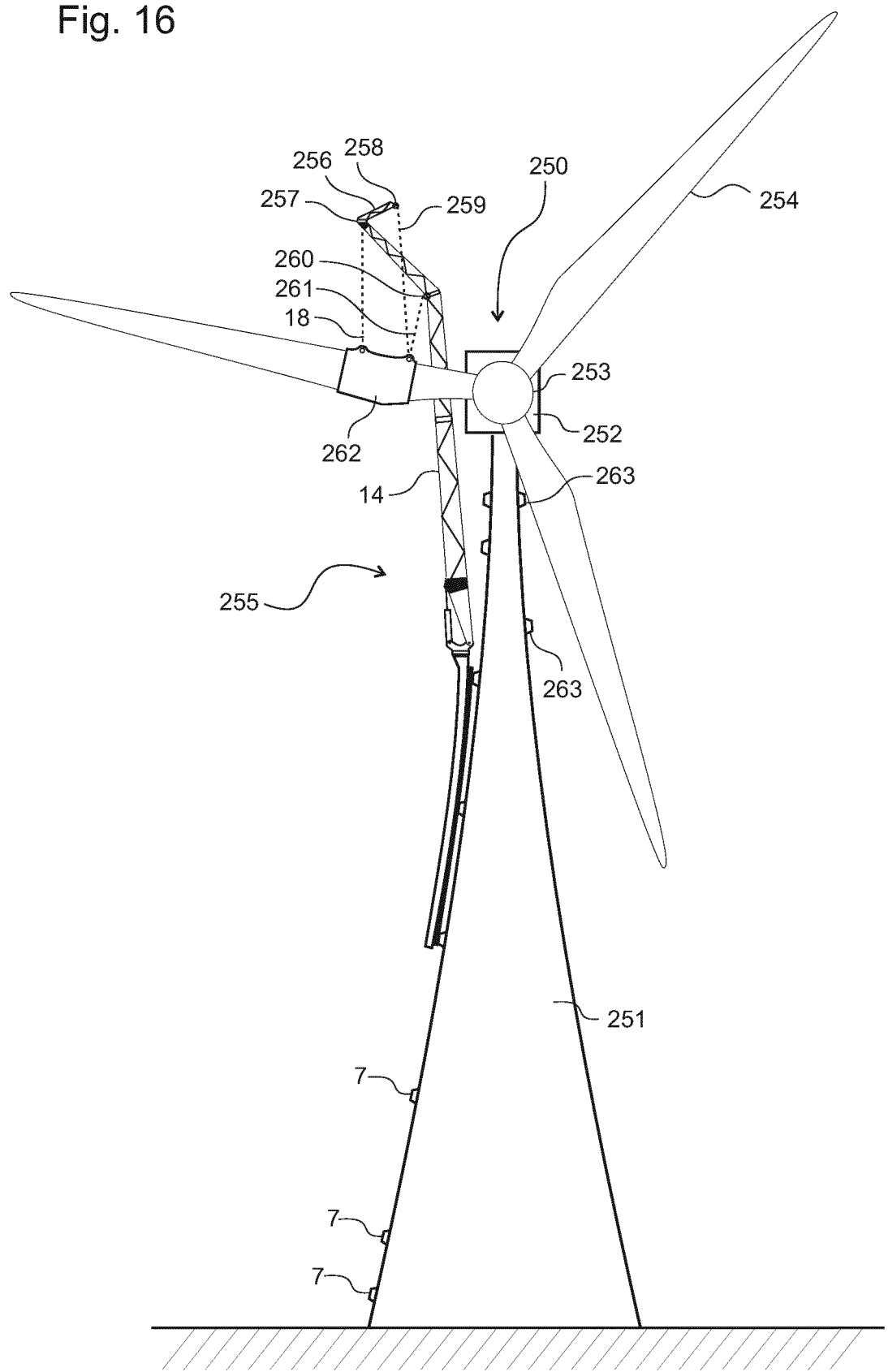
FIG. 16: a wind turbine and a hoisting system.

FIG. 16 shows an exemplary wind turbine 250 with nacelle 252, hub 253 and blades 254 whereto a hoisting system 255 is attached. The wind turbine can be any one of the wind turbines of the above embodiments. The hoisting system can be any one of the hoisting systems of the above embodiments. The figure shows an second hoisting point 260 from which a second hoisting cable 261 is connected to the load. The advantage of such a second hoisting cable is that the load can be controlled better. An alternative is that the boom 14 comprises an auxiliary boom 256 possibly attached to boom 257 with a yaw bearing 257. The auxiliary boom provides also a secondary hoisting point 258 that is connected by cable 259 to the load, e.g., frame 262 which is designed to capture a blade and to provide hoisting points without damaging it. The figure shows fixation points 7 at non-equidistant locations, which are not all numbered, Furthermore the figure shows fixation points 263 on the other side of the tower whereto a second hoisting system, possibly without a climbing system, can be attached using the first hoisting system.

The above description focuses at the installation of wind turbines using a hoisting system. The invention is not limited to the installation of wind turbines and may additionally or alternatively be used for maintenance or decommissioning of wind turbines using the hoisting system.

The fixation point can be used for rigidly fixing or slidably fixing the hoisting system to the tower of the wind turbine and/or as support for the climbing system of which the latter is also a form of fixation and guiding of the hoisting system. Thus, where reference is made to a fixation point, it is to be understood that the fixation point can serve either or both as fixation and guiding of the hoisting system. Of course those functions can be split over multiple points for example wherein at least one point has a fixation function only or wherein at least one point has a guiding function only.

The hoisting system may be controlled via a computer that only allows for operation within the operational limits of the system. The system may be controlled by remote and fixed controllers, e.g., from the ground, in the crane and in the turbine under construction. A crane operator may be assisted by cameras.

It is to be understood that in the present application, the term "comprising" does not exclude other elements or steps. Also, each of the terms "a" and "an" does not exclude a plurality.

The invention claimed is:

1. A hoisting system for installation or maintenance of a wind turbine, said hoisting system comprising:
    a column, a boom and a winch, the winch being configured to achieve a load bearing connection to an installed part of a tower of the wind turbine using one or more fixation points, wherein the one or more fixation points are successively located along a longitudinal direction of the tower, and wherein the column is arranged to move the hoisting system essentially in a vertical direction along said part of the tower when the load bearing connection is created; and
    an actuator configured to move the hoisting system up and down along previously installed parts of the tower, and wherein the hoisting system is arranged to install or remove any of a tower segment, a nacelle, a generator, a hub, and a blade in one or more combined hoists or in a single hoist,
    wherein the load bearing connection between the column and the one or more fixation points is such that during a hoisting operation the load bearing connection allows for at least 0.25 degrees rotational freedom about an imaginary horizontal axis between parts joined by the load bearing connection.

2. The hoisting system according to claim 1, wherein the column is arranged for creating the load bearing connection further using a rail enabling the hoisting system to be guided along the load bearing connection using the one or more fixation points.

3. The hoisting system according to claim 2, wherein the boom reaches to a distance that is beyond the rail by at least 15 m.

4. The hoisting system according to claim 3, wherein the boom is connected to the column via at least one of:
    a yaw bearing, wherein an angle between an axis of the yaw bearing and a length direction of the rail is at least 0.5 degrees; and
    a tilt hinge comprising a hydraulic cylinder or an electromechanical actuator for turning the boom with respect to the column about the tilt hinge allowing for a tilt angle change of at least 20 degrees.

5. The hoisting system according to claim 1, wherein the boom comprises a cable winch to operate a hoisting cable.

6. The hoisting system according to claim 1, wherein the boom is inflected or bent such that between the boom and an imaginary line segment from a hoisting point of the boom to a center of a tilt hinge a distance is obtained of at least 1.5 m.

7. The hoisting system according to claim 2, wherein the tower comprises the one or more fixation points, and wherein the rail is fixed to the column.

8. The hoisting system according to claim 2, wherein a first section of the rail comprises means for opening the rail for placing the rail onto a fixation point and for closing the rail resulting in the rail being slidably fixed to the fixation point for allowing the hoisting system to move relative to the tower essentially in a direction parallel to the rail.

9. The hoisting system according to claim 1, wherein the actuator is a climbing actuator, wherein the column is arranged for moving the hoisting system in an essentially vertical direction along the tower using a chain, the climbing actuator, or a wagon.

10. The hoisting system according to claim 9, wherein the column is arranged for moving the hoisting system using the climbing actuator, wherein the climbing actuator includes a connection actuator, wherein the connection actuator is arranged to move an end of the climbing actuator in a direction away from or to the column.

11. The hoisting system according to claim 9, wherein the column comprises a first climbing system and a second climbing system, each climbing system at one side being arranged for making a connection to a fixation point and at the other side being fixed to the column, wherein each climbing system is arranged for moving the hoisting system along the tower in a substantially vertical orientation.

12. The hoisting system according to claim 2, wherein the load bearing connection comprises a load bearing coupling for fixing the hoisting system to a fixation point such that during the hoisting operation the load bearing coupling passes at least 90% of a vertical force to the tower via a single fixation point positioned in the upper 65% of the length of the rail.

13. The hoisting system according to claim 1, further comprising a power source based on a chemical reaction, wherein the power source is a diesel generator, a fuel cell, or a battery.

14. The hoisting system according to claim 1, wherein the hoisting system is arranged for hoisting and installing a tower top segment and one or more of a nacelle, a generator, a hub and blades, or parts thereof, of the wind turbine.

15. A wind turbine, comprising:
a tower, a nacelle, a generator, a hub and at least one blade, wherein the tower comprises one or more fixation points for releasably fixing and guiding of the hoisting system according to claim 1, wherein the one or more fixation points are successively located along a longitudinal direction of the tower.

16. The wind turbine according to claim 15, wherein adjacent fixation points of the one or more fixation points are spaced at a mutual distance of more than 10 meters.

17. The wind turbine according to claim 15, wherein the tower comprises a plurality of stacked segments, wherein a first fixation point of a first segment is located at an overlap of a second fixation point of a second, adjacent tower segment.

18. The wind turbine according to claim 15, wherein at least one fixation point is strengthened at an outside of the tower along a distance from a center of the fixation point to at least 50 centimeters away from the center of the fixation point.

19. The wind turbine according to claim 15, wherein an inside of the tower is strengthened at the fixation point.

20. The wind turbine according to claim 15, wherein centers of three successive fixation points are aligned in the longitudinal direction of the tower with a maximum deviation of 20 centimeters in a radial direction of the tower.

21. The wind turbine according to claim 15, wherein the tower comprises a load bearing wall above 50% of a length of the tower.

22. The wind turbine according to claim 21, wherein a cross section of the load bearing wall in a direction perpendicular to the longitudinal direction of the tower is shaped like a circle or a polygon.

23. The wind turbine according to claim 15, wherein the tower is shaped like a tube and is built of a plurality of vertical segments, wherein each vertical segment is assembled from curved or bent plates that extend over a length of the vertical segment.

24. The wind turbine according to claim 23, wherein one or more of the plurality of vertical segments have a length between 10 m and 16 meters.

25. The wind turbine according to claim 15, wherein the tower is tapered above at least 50% of a length of the tower.

26. The wind turbine according to claim 15, wherein a sum of heights of all fixation points is less than 20% of a length of the tower.

27. The wind turbine according to claim 15, wherein the wind turbine is installed at a distance from the middle of a dike of less than 100 meters.

28. The wind turbine according to claim 15, wherein the one or more fixation points are a first set of one or more fixation points, the wind turbine comprising a second set of one or more fixation points successively located along the longitudinal direction of the tower and at an angle difference of at least 20 degrees from the first set of one or more fixation points in a cylindrical coordinate system around a tower center axis, wherein the second set of one or more fixation points are for releasable fixation of a second hoisting system.

29. The wind turbine according to claim 28, comprising a structure that passes sea level, wherein the structure comprises a transition piece comprising at least one of the one or more fixation points for the releasably fixing and guiding of the hoisting system.

30. The wind turbine according to claim 15, wherein the wind turbine has an axis height and the axis height is more than 80 meters.

31. The wind turbine according to claim 15, wherein the wind turbine has a design rpm, wherein the ratio between the design rpm at a wind speed of 12 m/s and at 6 m/s is less than 3 and more than 1.3.

32. The wind turbine according to claim 15, wherein the hoisting system is releasably fixed to an outside surface of substantially one side of the tower thereby forming a combination of the wind turbine and the hoisting system.

33. The wind turbine according to claim 32, wherein the hoisting system comprises a column and a rail, wherein the column is fixed to the rail and the rail is arranged for guiding the hoisting system along the tower, wherein the rail is rigidly or slidably joined to at least one of the fixation points.

34. The wind turbine according to claim 33, wherein the rail is at least one of slidably or rigidly fixed to at least two fixation points.

35. The wind turbine according to claim 33, wherein a highest fixation point measured from ground level that is used for releasably fixing the hoisting system to the tower for hoisting operations of tower parts during the erection of the wind turbine, is located at the overlap of the two top most already installed tower segments.

36. The wind turbine according to claim 32, wherein the hoisting system is releasably fixed to the tower without a contra weight or means for creating a contra force approximately at an opposite side of a hoisting point relative to a tilt hinge.

37. The hoisting system according to claim 1, wherein the actuator is a climbing actuator or a connection actuator.

* * * * *